(12) United States Patent
Tamil et al.

(10) Patent No.: US 7,272,309 B1
(45) Date of Patent: Sep. 18, 2007

(54) SYSTEM AND METHOD OF ROUTING DATA AT A PHOTONIC CORE

(75) Inventors: Lakshman S. Tamil, Plano, TX (US); Bing Li, San Diego, CA (US); David Wolf, Allen, TX (US); Scott Rothrock, Ashburn, VA (US); Mitch Entezari, Highland Village, TX (US)

(73) Assignee: Yotta Networks, LLC, Greenbrae, CA (US)

( * ) Notice: Subject to any disclaimer, the term of this patent is extended or adjusted under 35 U.S.C. 154(b) by 680 days.

(21) Appl. No.: 10/431,663

(22) Filed: May 8, 2003

Related U.S. Application Data

(60) Provisional application No. 60/378,717, filed on May 8, 2002.

(51) Int. Cl.
*H04J 14/00* (2006.01)
(52) U.S. Cl. .................... 398/47; 398/45; 398/46; 398/51; 398/54; 398/57; 370/351; 370/352; 370/355; 370/389
(58) Field of Classification Search ............ 398/41–51, 398/54, 57, 102, 197; 359/117, 123, 128; 370/351, 352, 355, 395, 389
See application file for complete search history.

(56) References Cited

U.S. PATENT DOCUMENTS

| | | | | |
|---|---|---|---|---|
| 5,018,130 A | * | 5/1991 | Suzuki et al. ................ 398/51 |
| 5,475,679 A | * | 12/1995 | Munter .................... 370/395.4 |
| 5,892,604 A | * | 4/1999 | Yamanaka et al. ............ 398/48 |
| 5,905,587 A | * | 5/1999 | Maeno et al. ................. 398/45 |
| 6,433,902 B1 | * | 8/2002 | Chiaroni et al. .............. 398/45 |
| 6,609,840 B2 | * | 8/2003 | Chow et al. ................ 398/102 |
| 6,721,315 B1 | * | 4/2004 | Xiong et al. ................ 370/389 |
| 6,771,905 B1 | * | 8/2004 | Bortz .......................... 398/45 |
| 6,826,368 B1 | * | 11/2004 | Koren et al. .................. 398/50 |
| 6,894,969 B1 | * | 5/2005 | Chidambaran et al. ..... 370/216 |
| 6,934,471 B1 | * | 8/2005 | Carvey et al. ................ 398/45 |
| 7,042,883 B2 | * | 5/2006 | Fan et al. ................ 370/395.4 |
| 2002/0075540 A1 | * | 6/2002 | Munter ....................... 359/128 |
| 2002/0191588 A1 | * | 12/2002 | Personick ................... 370/352 |
| 2004/0131366 A1 | * | 7/2004 | Tsushima et al. ........... 398/197 |

FOREIGN PATENT DOCUMENTS

EP  0 852 437 A2 * 7/1998

* cited by examiner

*Primary Examiner*—Kenneth Vanderpuye
*Assistant Examiner*—Li Liu
(74) *Attorney, Agent, or Firm*—Connolly Bove Lodge and Hutz

(57) ABSTRACT

Embodiments of the present invention provide a system and method for routing optical data. In one embodiment of the present invention, data can routed in a non-blocking fashion from a plurality of ingress edge units to a plurality of egress edge units by selectively connecting the ingress edge units to the egress edge units at a photonic core. Switching at the photonic core can be driven by a clock signal and does not require an electrical to optical conversion to occur at the core. This can allow switching on the nanosecond level, substantially faster than many prior art systems.

16 Claims, 13 Drawing Sheets

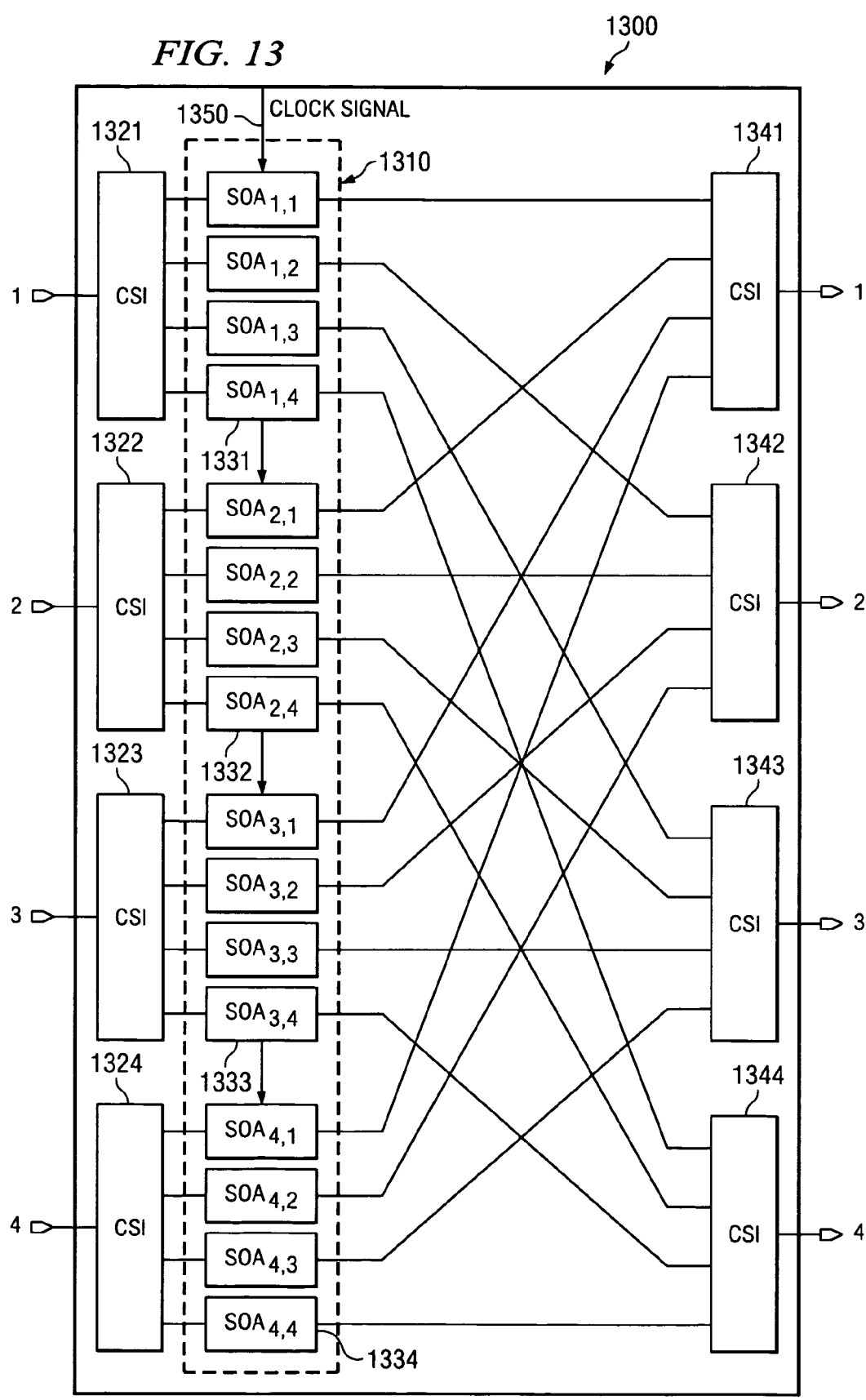

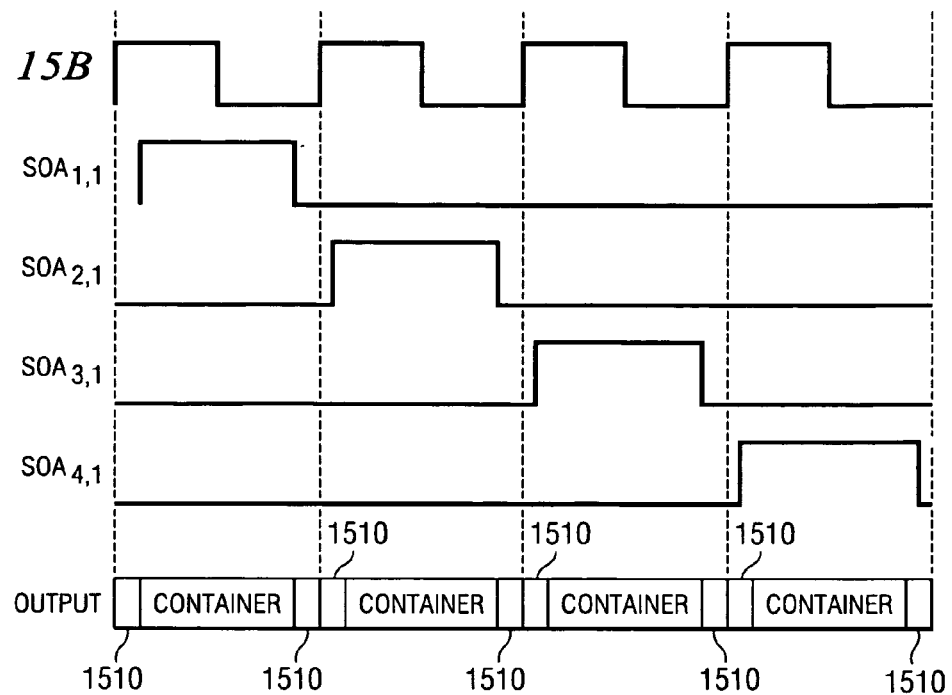
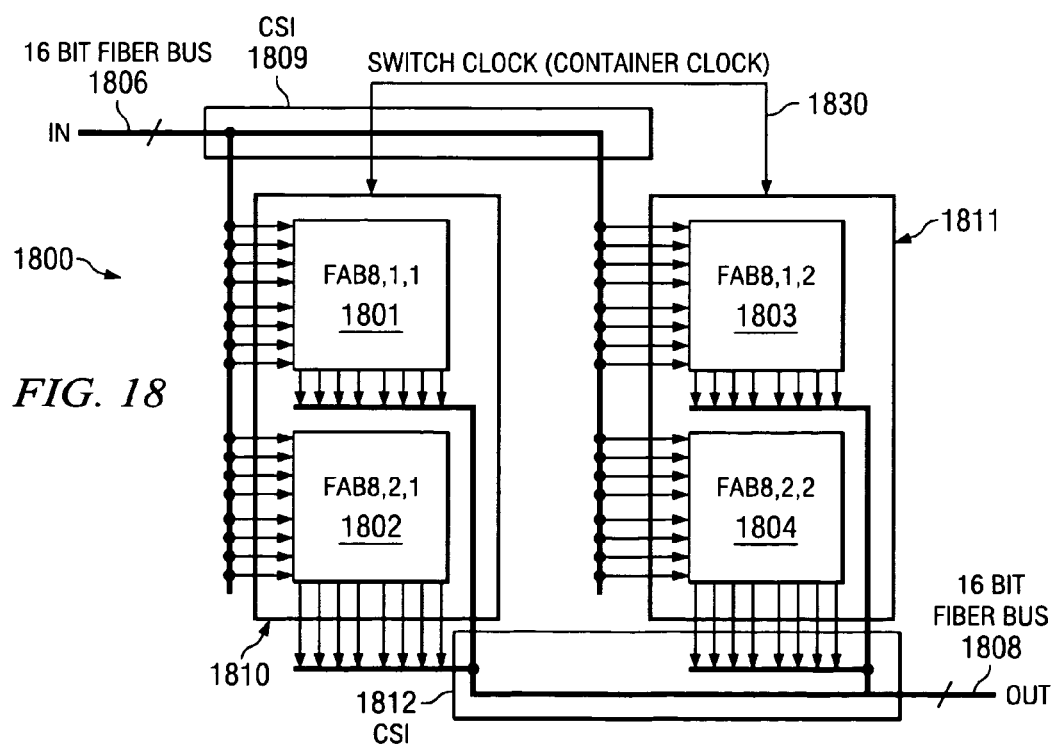

SYSTEM AND METHOD OF ROUTING DATA AT A PHOTONIC CORE

RELATED APPLICATIONS

The present application claims priority under 35 U.S.C. §119 to U.S. Provisional Patent Application Ser. No. 60/378,717, entitled "Apparatus and Method for a Large Photonic Switch Matrix," by inventors Li, et al., filed May 8, 2002, which is hereby fully incorporated by reference herein.

TECHNICAL FIELD OF THE INVENTION

The present invention relates to the field of optical communication. More particularly, embodiments of the present invention relate to switching data in a non-blocking manner at a photonic core.

BACKGROUND

In recent years, a considerable amount of optical fiber has been added to the national communications infrastructure. While optical fiber provides a great deal more bandwidth than a comparable conventional wire cable, continuing increases in the available bandwidth are necessary. This is driven in part by the exponential growth in IP traffic.

In response to the increased demand for bandwidth, communications carriers and equipment vendors are researching means for simplifying the national communications infrastructure. One of the areas of research relates to means for bringing the IP and SONET/SDH transport layers closer to the common optical transport layer. Solutions in this area are anticipated to be very cost-effective.

Conventionally, network nodes use complex protocol stacks to provide an interface between IP, SONET/SDH etc., and the optical transport layer. The various protocol layers may repeatedly (and unnecessarily) perform very similar interface functions. Further, each of the protocol layers may have its own service provisioning, configuration management, billing and other operation services.

Currently available switching products are usually based on a common electrical switching fabric. The discontinuity of the optical layer within the switching layer creates several fundamental problems with respect to simplification of the communications interface. One of these problems is the scalability of these systems. Although the bandwidth and speed of these systems continues to increase, they are not expected to be able to meet the traffic demands of massive, content-based services. Even if these demands could be met, it is anticipated that the many interconnects and fabric elements required in a terabit electrical switching fabric would present an operational nightmare in terms of the provisioning and management of the system.

Another of problems with the systems is that, while electrical switches may be fast, they are an order of magnitude slower than the photonic switches. Electrical chips can currently handle a data rate of about 2.5 Gbps, while a photonic switching element can switch a 40-nm bandwidth channel at nano second speed. Thus, the throughput of an electrical switching fabric will be substantially lower than a comparable photonic switching fabric.

A related problem is that, even though photonic switches have the potential to operate at much higher data rates than electrical switches, it is very difficult to implement a photonic switch at these data rates. As a result of these difficulties, photonic switching systems in the prior art do not switch data at the packet level. Instead, connections are maintained from a particular set of ingress edges to a particular set of egress edges. These connections remain in place for long periods of time (e.g., hours or even days). The time required to change the connections and the amount of data lost during the change is therefore insignificant in terms of the efficiency of the system. In other words, the ratio of the number of bits lost to the number of bits successfully transmitted is very low.

SUMMARY OF THE INVENTION

Embodiments of the present invention provide a system and method for routing optical data in a non-blocking fashion that eliminates, or at least substantially reduces, the problems associated with prior art systems and methods of routing optical data. One embodiment of the present invention includes a photonic core having an plurality of inputs and a plurality of outputs. The photonic core is operable to selectively connect the inputs to the outputs such that no two inputs are connected to the same output in a given time slot. This allows non-blocking routing of data in a time slot. The inputs and outputs can be connected by a fabric of path switches and, in one embodiment of the present invention, the path switches can be silicon optical amplifiers ("SOAs"). The SOAs can be driven by a clock signal from a switch clock to change connections over a schedule of time slots. Because the SOAs can switch based on a predetermined schedule, an optical to electrical conversion does not have to occur at the photonic core.

Another embodiment of the present invention includes a method for routing data that comprises receiving a set of data on a plurality of inputs; selectively connecting the plurality of inputs to a plurality of outputs based on a schedule, wherein each of the plurality of inputs is connected to a different output in a time slot; and communicating the data out of the photonic core on the plurality of outputs.

Yet another embodiment of the present invention comprises a set of ingress edge units and egress edge units connected to a photonic core. Each ingress edge unit can comprise working edge container processors to transmit optical data, an edge container aggregation component to multiplex signals from the edge container processors and an edge amplification and protection component to amplify the outgoing multiplexed signal. Each egress edge unit can include an edge amplification and protection component to amplify an incoming optical signal, an edge container aggregation component to demultiplex the received signal and a plurality of working edge container processors to receive and process the demultiplexed signal. The photonic core can have a plurality of inputs connected to the ingress edge units and outputs connected to the egress edge units. The photonic core can selectively connect the inputs to the outputs to route data from the ingress edge units to the egress edge units in a non-blocking manner.

The present invention provides an advantage over previously developed systems and methods of routing data by eliminating or reducing the need to perform an optical to electrical conversion at a cross connect. This allows the photonic core of the present invention to switch data paths at a much greater speed than prior art systems.

As an additional advantage, because embodiments of the photonic core of the present invention can switch at a high rate of speed, the photonic core can switch at the container or packet level with low bit loss.

The system and method of the present invention provide yet another advantage over prior art systems and methods of routing optical data by allowing switching to occur in a non-blocking manner without having to maintain cross-connects for a long period of time.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 13 is a diagrammatic representation of a 4×4 switch fabric according to one embodiment of the present invention;

FIGS. 15A and 15B illustrate two embodiments of driving the ON states of SOAs in a switch fabric;

FIG. 18 is a diagrammatic representation of another embodiment of a 16×16 switch fabric;

DETAILED DESCRIPTION

Embodiments of the present invention are illustrated in the FIGURES, like numerals being used to refer to like and corresponding parts of the various drawings.

Embodiments of the present invention provide a system and method for routing optical data. In one embodiment of the present invention, data can be routed in a non-blocking fashion from a plurality of the ingress edge units to a plurality of egress edge units by selectively connecting the ingress edge units to the egress edge units at a photonic core. Switching at the photonic core can be driven by a clock signal and does not require an electrical to optical conversion to occur at the core. This can allow switching on the nanosecond level, substantially faster than many prior art systems.

Figure 1:
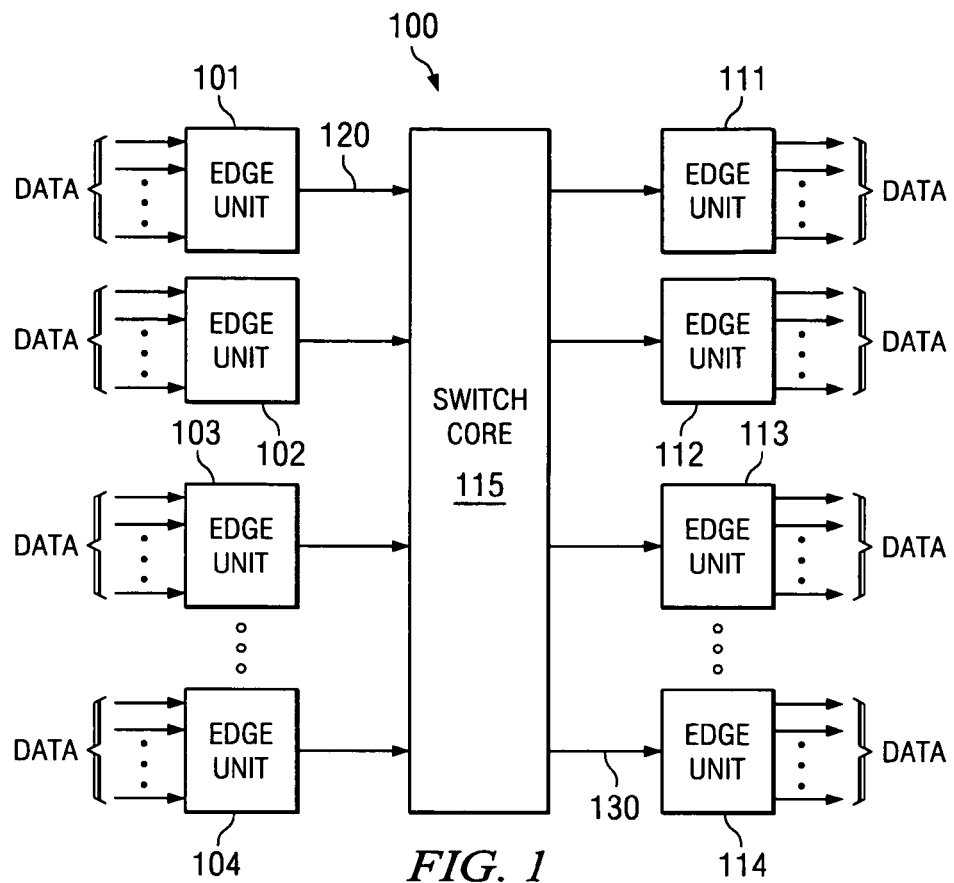
FIG. 1 provides a diagrammatic representation of a system for the transmission of data from multiple ingress edge units to multiple egress edges via a photonic core.

FIG. 1 provides a diagrammatic representation of the system 100 for the transmission of data from multiple ingress edge units (e.g., edge units 101-104) to multiple egress edges (e.g., edge units 111-114) via a photonic core 115 ("switch core 115"). While FIG. 1 illustrates the transmission of data from ingress edge units to egress edge units, it should be noted that each edge unit can be configured to be both an ingress edge unit and an egress edge unit. Photonic core 115 can route data from an ingress edge unit to an egress edge unit in a non-blocking fashion. In other words, at a given time, each of the ingress edge units is connected via a photonic core 115 to one of the egress edge units and can transmit its data to the corresponding egress edge unit without being blocked by the transfer between other ingress/egress edge units.

In one embodiment of the present invention, the non-blocking operation of core 115 is achieved by taking all of the data received by a particular ingress edge unit (e.g., ingress edge unit 101) via the multiple input streams and distributing the data from the different input streams into "containers" of data which are then transmitted over an interconnect (e.g., interconnect 120) to switch core 115. In one embodiment of the present invention, the data can be formatted into containers and be transmitted as described in U.S. patent application Ser. No. 10/431,795, entitled "Container Based CrossConnect" by Mitch Entezari, et al., filed May 8, 2003 (the "Container Application"), which is hereby fully incorporated by reference herein. Switch core 115 can route the containers according to a non-blocking schedule and transmit the containers over interconnects (e.g., interconnect 130) to the different egress edge units 111-114. When a container is received at the corresponding destination egress edge, the data in the container is distributed to the edge's various ports according to the destination addresses of the data.

Figure 2:
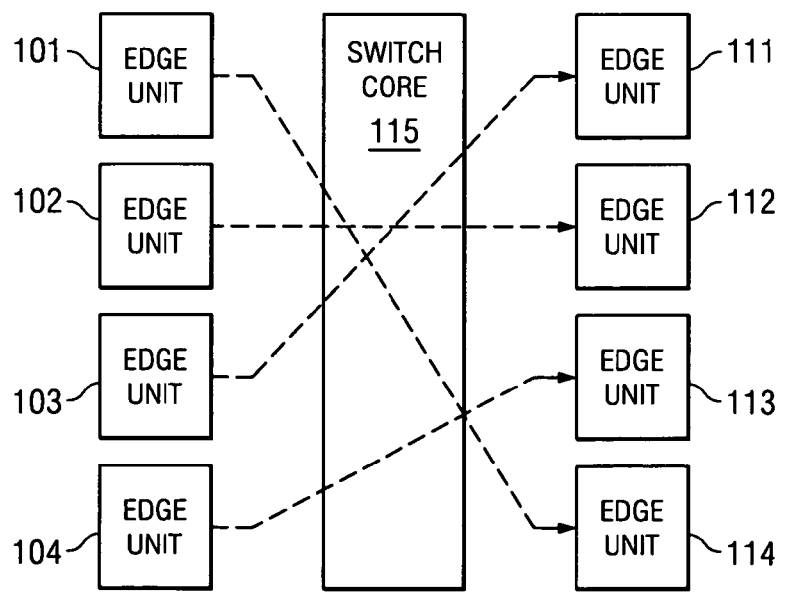
FIG. 2 illustrates an embodiment of the flow of data in a system for the transmission of data from multiple ingress edge units to multiple egress edge units via a photonic core.

FIG. 2 illustrates an embodiment of a system for the transmission of data from multiple ingress edge units (e.g., ingress edge units 101-104) to multiple egress edge units (e.g., egress edge units 110-114) through an optical switch core 115. It is possible to connect any one of the ingress edges with any one of the egress edges. At any given time, however, each ingress edge unit can only be connected to a single egress edge unit, and vice versa. The dashed lines indicate one set of possible connections. Specifically, ingress edge unit 101 is connected to egress edge unit 104, ingress edge unit 102 is connected to egress edge unit 112, ingress edge unit 103 is connected to egress edge unit 111, and ingress edge unit 104 is connected to egress edge unit 113. These connections may be seen more clearly in the diagram of FIG. 3.

Figure 3:
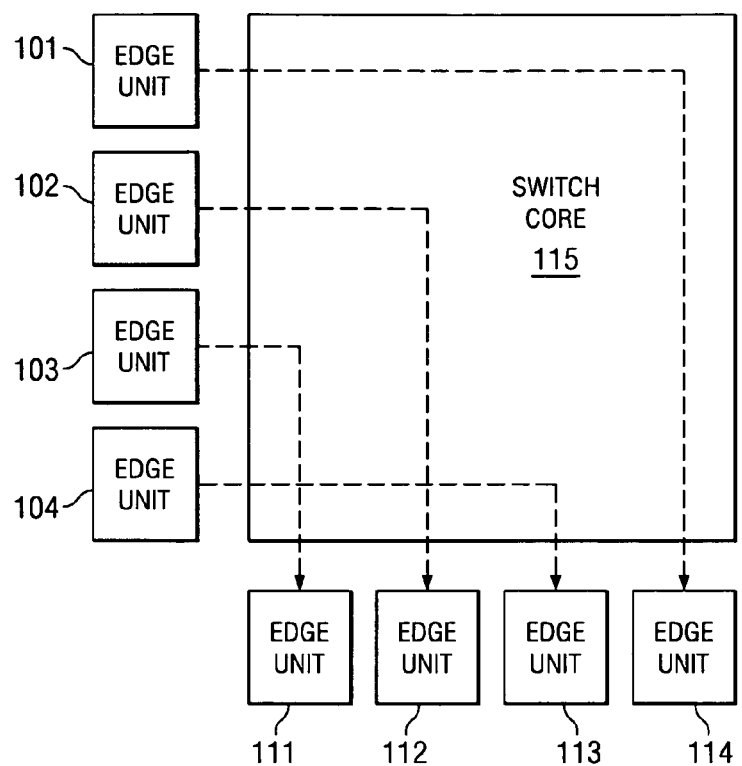
FIG. 3 is a diagrammatic representation of a set of connections that can be established in a photonic core.

If a set of data containers arrives at switch core 115 from the ingress edge units when the connections of FIGS. 2 and 3 are established, the container from ingress edge unit 101 will be transmitted to egress edge unit 114, the container from ingress edge unit 102 will be transmitted to egress edge unit 112, the container from ingress edge unit 103 will be transmitted to egress edge unit 111 and the container from ingress edge unit 104 will be transmitted to egress edge unit 113. A new set of connections may be established for the next set of data containers received from the ingress edges, and the data containers received from the ingress edges at that time would be transmitted to the egress edges determined by the new set of connections. Thus, the switch core cross-connects the edges and is capable of switching the connections on a container-by-container basis. Coordination of the connections established at optical core 115 with the transmission of data from the ingress edges can be achieved through synchronization of the edge units and photonic core. One embodiment of a method for synchronization is described in conjunction with FIGS. 21-26. However, any synchronization scheme can be used.

Figure 4:
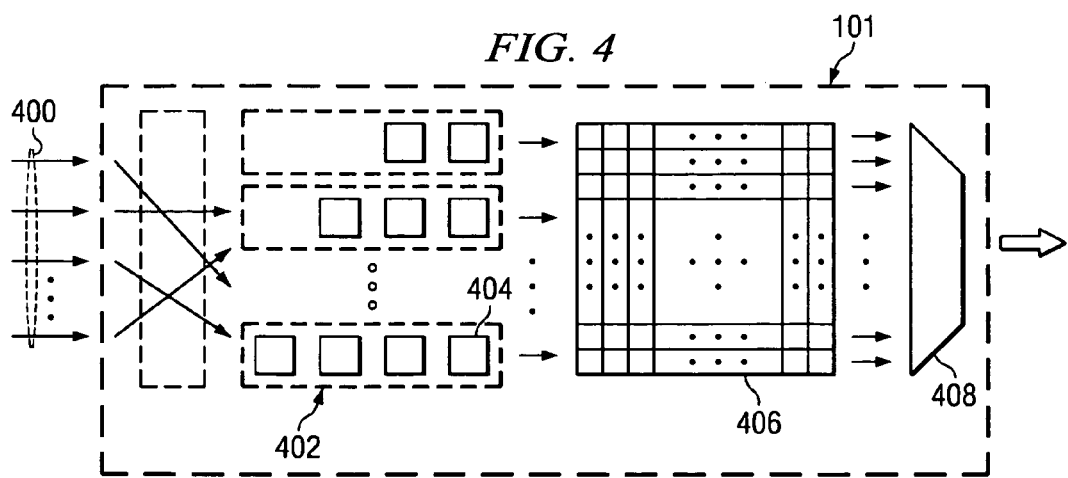
FIG. 4 is a diagram illustrating the distribution and packaging of data within an ingress edge according to one embodiment of the present invention.

Referring to FIG. 4, a diagram illustrating the distribution and packaging of data within an ingress edge according to one embodiment of the present invention is shown. Data is received by the ingress edge in the form of a plurality of data streams 400, each of which is input through one of a plurality of ingress ports. Each data stream 400 may contain data that is addressed to different ports of different egress edge units. The received data is distributed to a plurality of buffers 402. Each buffer 402 collects data that is addressed to a single egress edge unit. Data in buffers 402 is packaged into containers 404, wherein each container holds data for a single corresponding egress edge. The containers are aggregated and then transmitted to the switch core for routing to the appropriate egress edge. The aggregated containers are transmitted to the destination egress edges by transmitting them in time slots 406 that correspond to the destination egress edges. The containers leaving in a particular time slot can be multiplexed together at multiplexer 408 for transmission to the switch core. When the aggregated, containerized data is received by the egress edges, it is deconstructed into output data streams in a process that is essentially the reverse of the ingress edge processing.

Thus, in one embodiment of the present invention, a plurality of data streams is received by an ingress edge. The data streams can be multiplexed and routed to a plurality of container generators. The container generators create containers in which the received data is embodied. In one embodiment, each container generator creates an optical data signal of a unique wavelength, wherein the optical data signal embodies the containers. Each of the generated containers includes only data having a common destination edge. The containers are aggregated and, at the appropriate times, are transmitted to a photonic switch core, which routes the containers to the corresponding destination edges. The destination edges receive the respective optical data signals embodying the containers and demultiplex the signals, sending each wavelength to a corresponding component that deconstructs the received containers. The deconstructed containers are routed to the corresponding output data ports to form an output data stream.

Figure 5:
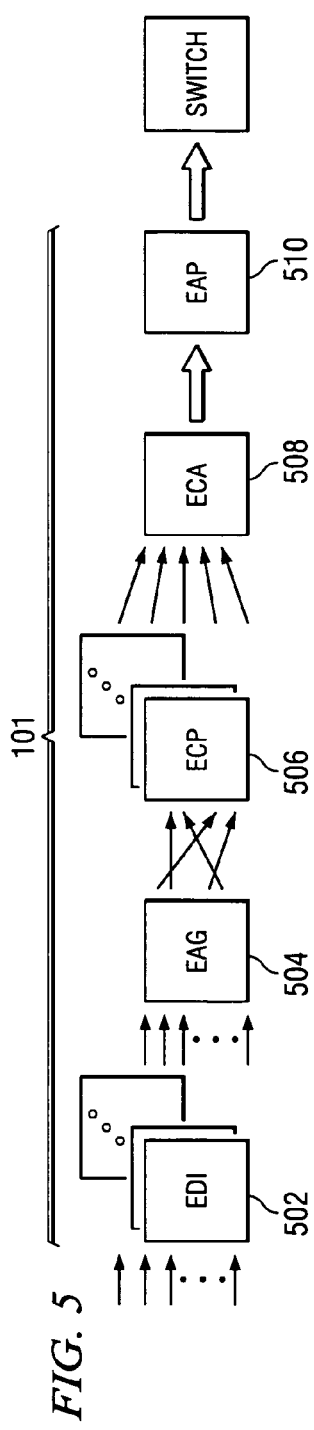
FIG. 5 is a diagram illustrating the structure of an ingress/egress edge unit in a preferred embodiment is shown.

Referring to FIG. 5, a diagram illustrating the structure of an ingress/egress edge unit in a preferred embodiment is shown. In this embodiment, edge unit 101 comprises a plurality of edge data interfaces 502, an edge adaptation and grooming component 504, a plurality of edge container processors 506, an edge container aggregation component 508 and an edge amplification and protection component 510. These components process the data flowing through edge unit 101. Edge unit 101 also includes an edge management and control component and an edge clock and synchronization component that are not explicitly shown in the figure.

Broadly speaking, the components of the edge unit function as follows. Edge data interfaces 502 simply provide an interface between edge adaptation and grooming component 504 and the sources of the data streams. Accordingly, edge data interfaces 502 may not be necessary in some embodiments. Edge adaptation and grooming component 504 serves to receive the data streams and to distribute the data contained therein to the plurality of edge container processors 506, each of which is associated with a different wavelength of light. Edge container processors 506 create containers of data that hold the data received from edge adaptation and grooming component 504. All of the data within a container is addressed to the same destination edge. The data containers created by edge container processors 506 are transmitted to edge container aggregation component 508. Edge container aggregation component 508 combines the containers from each of edge container processors 506 (each of which comprises a different wavelength of light) into a single, multiple-wavelength container for each time slot in a switch schedule. The multiple-wavelength container is amplified and protected by edge amplification and protection component 510 and is then provided to the switch core, which delivers the container to the destination edge. This process is repeated so that edge unit 101 provides a single, multiple-wavelength container to the switch core for each timeslot in the schedule.

The foregoing description of edge unit 101 illustrates the ingress-edge functionality of the edge unit. As noted above, the edge units in a preferred embodiment are configured to function as both ingress and egress edges. Accordingly, the components of edge unit 101 are configured to perform the reverse of the foregoing process in the context of the egress edge.

Edge Data Interface ("EDI"). The first component, or set of components of edge unit 101 is edge data interface(s) 502. The edge data interface is simply an interface to the I/O card from which data is received. If the ingress edge is loosely coupled to a customer's system, the edge data interface provides a means for the data to be delivered from the customers I/O shelves to the edge adaptation and grooming component of the ingress edge. It should be noted that, if the ingress edge is tightly coupled to the customer's system, it may not be necessary to provide the interface function of the edge data interface components. It may therefore be possible to eliminate this component in some embodiments.

Edge Adaptation And Grooming Component ("EAG"). The next component of edge unit 101 is the edge adaptation and grooming component module. In the preferred embodiment, the edge adaptation and grooming component is an STS-1 level electrical cross connect. The purpose of the edge adaptation and grooming component module is to receive the input data and to distribute the data to the appropriate edge container processor modules. The edge adaptation and grooming component module also grooms the data traffic to reduce the number of containers (and time slots) which are necessary to carry the data from the ingress edge to the corresponding egress edge. The edge adaptation and grooming component module also serves to support the edge container processor protection function, in that it is configured to redirect data traffic from a failed edge container processor module to the protection module upon occurrence of failure.

In one embodiment, the edge adaptation and grooming module is an STS-1 level electrical crossconnect capable of supporting up to 6144×7680 STS-1's from ingress to egress and 7680×6144 STS-1's from egress to ingress. It interfaces to the edge data path interface or user interface (I/O) modules and edge container processing modules using the standard 2.488 G SONET compliant signals. In this embodiment, the edge adaptation and grooming component is capable of supporting up to 128 bidirectional 2.48 G signals to/from the edge data interface or i/o modules and up to 160 bidirectional 2.48 G signals to/from the edge container processor modules. The total number of 2.48 G signals between the edge adaptation and grooming component and edge container processor modules depends on the number of edge container processor modules required to support the specific system size.

The edge adaptation and grooming component module is provided to distribute the user traffic across all the edge container processor modules in order to groom all the traffic for a given edge and reduce the required number of container time slots through the photonic switch core from one edge to another edge. The edge adaptation and grooming component module is also used to support the edge container processor protection switching function. In case of edge container processor failure, all the traffic from/to the failed edge container processor module must be redirected from/to the protection edge container processor module. Each edge adaptation and grooming component module is protected one-to-one.

Edge Container Processor ("ECP"). The next component of edge unit 101 is the edge container processor module 506. There are a plurality of edge container processor modules, each of which can receive data from edge adaptation and grooming component module 504. The edge container processor modules are configured to "containerize" or create containers which hold the data received from the edge adaptation and grooming component module. A container is simply an aggregation of data, similar to a packet. Each edge container processor module has a corresponding wavelength and is configured to provide an output data signal at that wavelength. Thus, the set of edge container processor modules generate parallel optical output data streams at their respective wavelengths. These output data streams are then provided to the edge container aggregation component 508.

In one embodiment, the edge container processor module contains the unique processing required to utilize the photonic switch core. The input to this module is a collection of STS-48 signals received from the edge adaptation and grooming component module. For an individual edge container processor, a total of 16 STS-48 signals are required. Each edge container processor receives 8 STS-48s of data from a working edge adaptation and grooming component and 8 STS-48s of data from a protection edge adaptation and grooming component. At each edge container processor, 4 STS-48s from each edge adaptation and grooming component are sent to the container transport ASIC. Inside the container transport ASIC, the processing required to modify the continuous stream of received data into the burst mode data to be transmitted through the core is performed. Each container transport ASIC can generate and process 195 containers each frame. Each frame is 125 microseconds long. The first 192 containers of each frame are directly mapped to the 192 (4×48) STS-1s from the edge adaptation and grooming component module. The remaining three containers are generated internally by the ASIC for diagnostic and default isolation purposes from the container transport ASIC, the data is sent to a high-speed multiplexer, and then on to an optical transmitter. From the optical transmitter, the signal is transmitted to the edge container aggregation component modules. Because there are two edge container aggregation component modules, the signal is split, with one copy going to each of the edge container aggregation component modules.

As noted above, the edge units may function as both ingress edges and egress edges. In egress mode, two optical signals returning from the edge container aggregation component modules are delivered to two optical receivers. Each receiver converts the optical signals to electrical signals, and then forwards them to a burst receiver. Inside the burst receiver, clock recovery and data recovery is performed. The data is also demultiplexed to 16 bits. The 16 bits of data and the recovered clock signal are sent to the container transport ASIC. The ASIC restores the signal to a continuous stream and corrects errors that may be introduced through the core. The ASIC then sends 4 STS-48s back to the primary and secondary edge adaptation and grooming component modules, using independent links for each module. Each edge adaptation and grooming component is able to support up to 20 edge container processor modules (of which 19 are typically working and one is for protection). In one embodiment, the working edge container processor modules will use fixed-wavelength lasers, while the protect module will use tunable lasers.

Edge Container Aggregation Component ("ECA"). The next component of edge unit 101 is the edge container aggregation component module. The edge container aggregation component module serves to aggregate the containers by multiplexing the signals from the different edge container processor modules into a single, multiple-wavelength signal. In other words, the signal is time-multiplexed, wherein the signal transmitted by the edge unit has multiple components, each having a different wavelength.

Edge Amplification And Protection Component ("EAP"). The edge amplification and protection component module is configured to amplify the wavelength-multiplexed signal produced by the edge container aggregation component module and to protect the signal. The optical signal from the edge amplification and protection component module is then output from the ingress edge. The output signal is transmitted to the switch core for routing to the appropriate egress edge.

It should be noted that, in the preferred embodiment, the various components of the edges may include redundant components, so that if one fails, the process can be continued using the redundant component. This holds true for the switch core as well. Thus, in one embodiment, each edge unit contains two EAGs (one of which is redundant), twenty ECPs (one of which provides protection for the others), two ECAs and two EAPs (where one of each is redundant).

Figure 6:
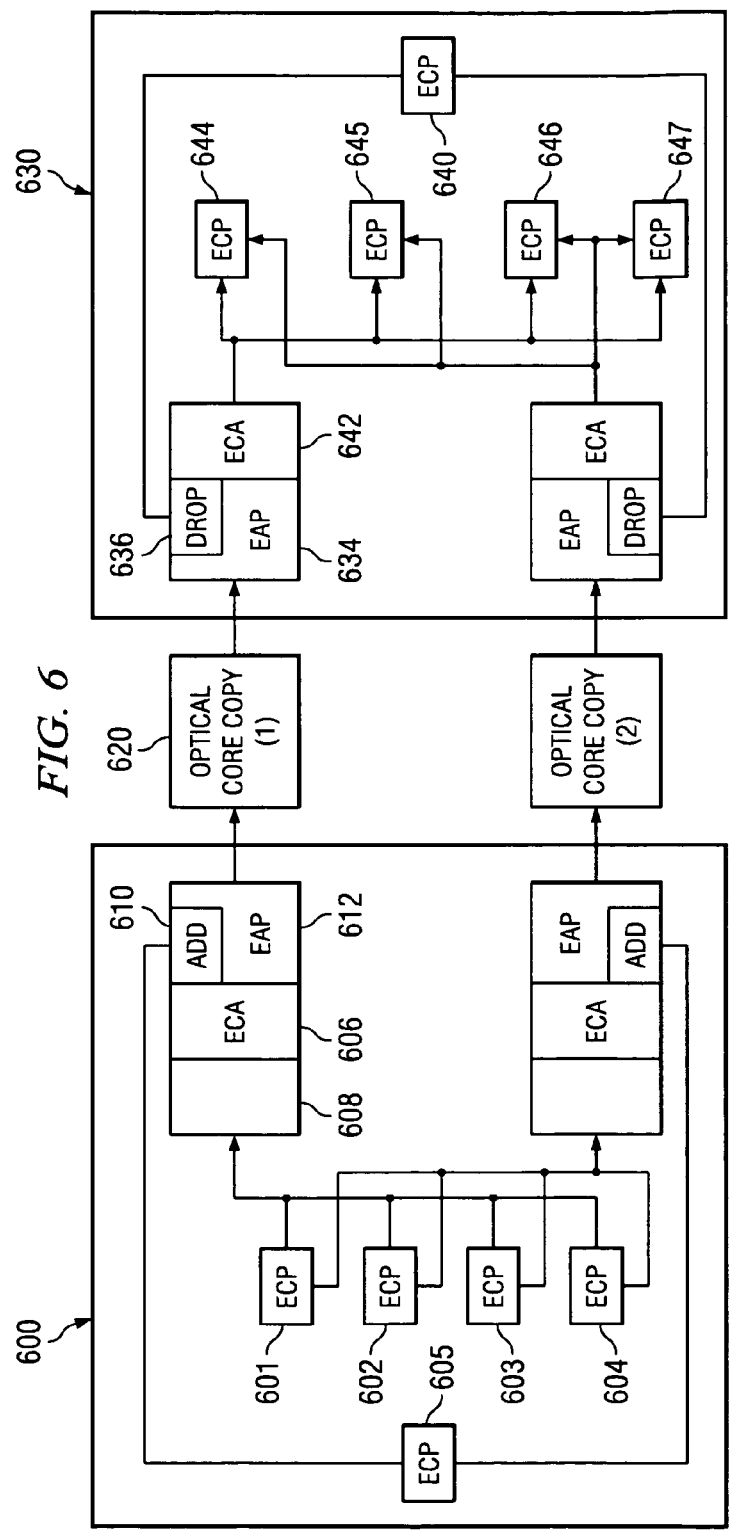
FIG. 6 provides a diagrammatic representation of the optical path of containers in one embodiment of a system for the transmission of data.

FIG. 6 provides a diagrammatic representation of the optical path of containers in one embodiment of a system for the transmission of data. Because optical transmission of containers at the ingress edge unit 600 can begin at the ECP, only the ECPs and downstream components are shown. After the payload data is mapped into a container to be carried by a particular wavelength and time slot ($\lambda_i$ and $T_j$) (i.e., after processing by the EDI, EAG and ECP as described in conjunction with FIG. 5), an ECP can transmit the container onto a fiber at, for example, 12.5 Gbps. Ingress edge unit 600 can include several working ECPs (e.g., ECPs 601-604) and a protection ECP 605. If a working ECP fails, the protection ECP 605 can transmit the containers for the failed working ECP. When protection ECP 605 is not covering a working ECP, protection ECP 605 can send out an idle single (i.e., empty containers) at an predefined power level with valid training and framing pattern.

Two protection schemes can be implemented at edge unit 600. In one protection scheme a number of extra wavelengths can be provided at each edge unit. For example, if each edge unit supports 40 lambdas, thirty-six lambdas can be designated as working channels and four additional lambdas can be provided as protection channels. This can be achieved by providing, at each edge unit, two additional ECPs that provide two lambdas each, or four additional ECPs that provide one lambda each. Note that this implies that the overall sparing bandwidth of the entire network is 4×12.5 Gbps. Considering all transmitters (TXs) and receivers (RXs) working on one wavelength as a group, any single failure in this group (TX or RX) will require a replacement of the complete group by the group on a sparing wavelength. Thus, protection switching to sparing wavelength edge container processor will be executed in all edge units.

In another protection scheme, a tunable ECP can be used in lieu of a fixed wavelength ECP to provide protection. In this scheme, an edge container processor failure in one edge unit will only cause the protection switch inside the same edge unit. The tunable edge container processor can have any number of wavelength generators. If, however, the tunable edge container processor only has one wavelength generator, it should, in the preferred embodiment, be able to cover the entire wavelength spectrum used by the particular edge unit with which it is associated.

In the embodiment of FIG. 6 a single tunable protection ECP 605 is illustrated. For tunable wavelength sparing, the wavelengths used by particular working ECPs can be grouped to a tunable ECP. Typically groups will include an odd number wavelength and an even number wavelength. Grouping of wavelengths can allow the use of tunable lasers that only cover a portion of the C-Band. Based on the different tunable laser techniques, the covered wavelengths can range from 3.2 nm (Agere), 6.4 nm (Multiplex), 16 nm (Marconi, DBR based), to 32 nm (Nortel, VCSEL based, 10 ms). The tuning speeds can range from 10 µs to 100 ms. The tunable ECP can have multiple wavelength generators to cover the entire C-Band or can have a single generator that can cover the entire C-Band, or at least the portion of the C-Band used by the working ECPs. Because the tunable ECP(s) can cover any working wavelength, the ingress edge unit can use all wavelengths in a band without having to reserve specific sparing wavelengths. When protection ECP is not covering a working ECP, it can send out an "idle" signal at a predefined power level.

Each ECP can transmit containers to an ECA 606. To provide added protection, the signal from an ECP can be split into a copy (1) and copy (2), by, for example, an 50/50 passive splitter, and send one copy to a working ECA and another copy to a backup ECA. At ECA 606, the signals arriving from multiple ECPs can be power balanced at a variable optical attenuator ("VOA") array 608. Example VOA arrays are manufactured by Bookham Technology, based in Milton Abingdon, UK or by Palo Alto, Calif. based GemFire). The ECA 606 can aggregate the containers by multiplexing the signals from the different edge container processor modules into a single, multiple-wavelength signal. The ECA can then pass the multiplexed signal to EAP component 612.

The EAP module can be configured to amplify the wavelength-multiplexed signal produced by the edge container aggregation component module and to protect the signal. At EAP component 612, a boost amplifier can amplify the multiplexed signal and an optical add/drop multiplexer ("OADM") 610 can add the protection signal to the outgoing data stream if the protection ECP 605 is covering a failed working ECP. The EAP can then pass the signal to the photonic core for routing to the appropriate egress edge unit. It should be noted that if there is a failure in the primary (i.e., copy (1)) path, data can be routed through a second (i.e., copy (2)) path.

At egress edge unit 630, the optical signal arriving from switch core 620 can be amplified by pre-amplifier at EAP module 634. Additionally, at EAP module 634, the protection signal can be dropped from the incoming stream at OADM 636 and forwarded to a tunable protection ECP 640. The ECA 642 can demultiplex the remainder of the signal and forward the data at the appropriate wavelengths to egress ECPs 644-647.

Figure 7:
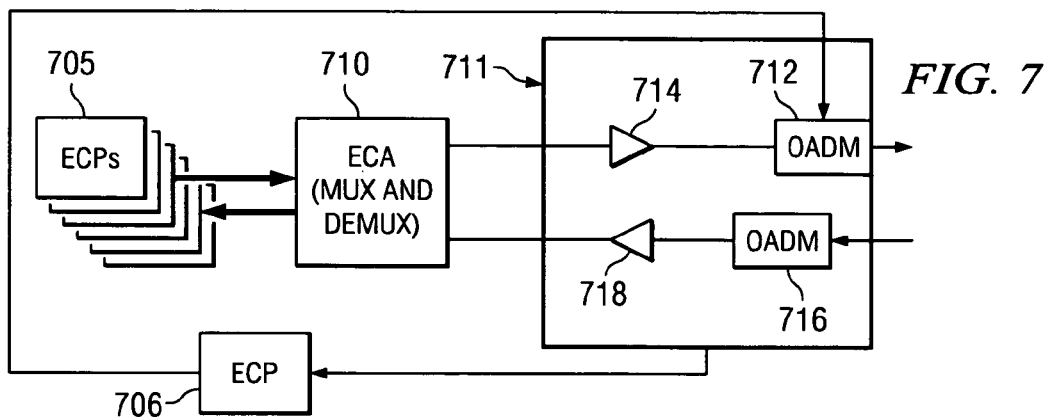
FIG. 7 illustrates one embodiment of the optical architecture at an edge unit that acts as both an ingress edge unit and egress edge unit.

FIG. 7 illustrates one embodiment of the optical architecture at a edge unit that acts as both an ingress edge unit and egress edge unit. Each edge unit can comprise multiple working ECPs 705 and a tunable protection ECP 706. The ECPs can pass optical data to and receive optical data from an ECA 710. ECA 710 can multiplex outgoing data and demultiplex incoming optical data for the working ECPs 705. For an outgoing signal, EAP 711 can add the protection signal from ECP 706 at OADM 712 and boast the signal boost amplifier 714 prior to sending the signal to the optical core. The protection signal can be added to the outgoing optical stream, in one embodiment of the present invention, by an optical coupler or an add/drop filter. For an incoming signal, EAP 711 can drop the protection signal at OADM 716 and send the protection signal to ECP 706. Additionally, EAP 711 can amplify the incoming signal at pre-amplifier 718 prior to sending the signal to ECA 710. At ECA 710, the signal can be demultiplexed and sent to the appropriate working ECPs.

It should be noted that FIG. 7 illustrates the optical path in the edge unit and that specific hardware can be shared among several of the components. For example, OADM 712 and OADM 716 can comprise a single optical add/drop multiplexer. Moreover, certain components can be rearranged. For example, for the outgoing signal, amplification can occur after the protection signal is added, or for the incoming signal, amplification can occur before the protection signal is dropped. The order of OADM and amplification can depend on the power of the protection signal and other factors as would be understood by those of skill in the art.

Figure 8:
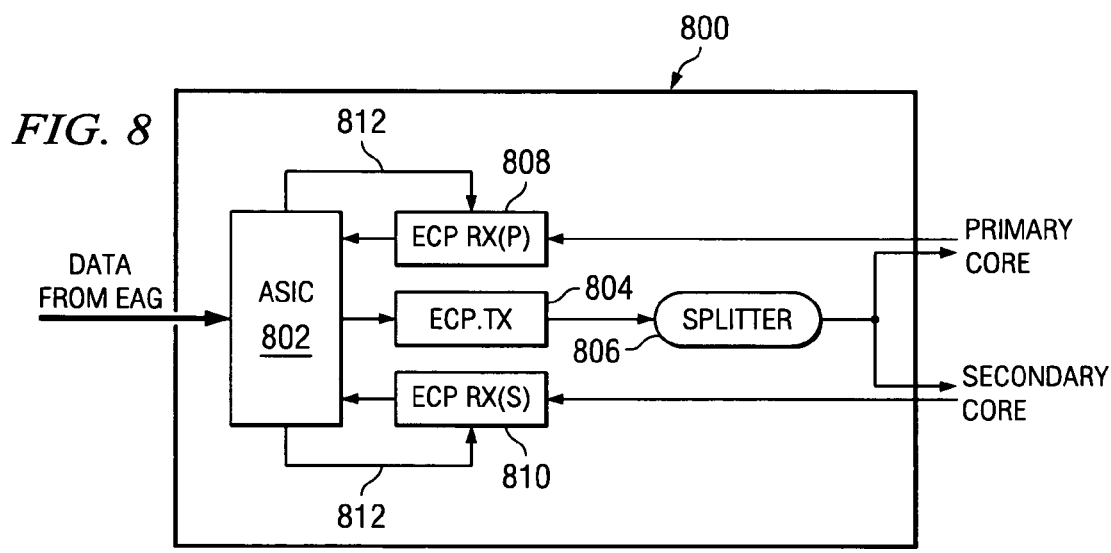
FIG. 8 illustrates one embodiment of an edge container processor.

FIG. 8 illustrates one embodiment of an ECP 800. ECP 800 can include an ASIC 802 that accepts data from an EAG through an FEC encoder, forms a continuous bit stream and forwards the bit stream to transmitter 804. Transmitter 804 can then output an optical signal to the switch core with optical splitter 806 splitting the outgoing stream to route data to a primary and a secondary (i.e., backup) optical core. In another embodiment of the present invention, ECP 800 can include an additional transmitter to send data to a backup optical core. However, as splitters typically require less space than transmitters, the embodiment of FIG. 8 allows the ECP to be smaller than a system using a backup transmitter while still providing a backup transmission. On the receive side, a primary receiver 808 and a secondary receiver 810 can receive a signal from a primary and a backup optical core respectively. ASIC 802 can determine which signal to use according to the FEC error statistics of primary receiver 808 and secondary receiver 810, respectively. ASIC 802 can reset the receivers with a trigger pulse signal 812.

Figure 9:
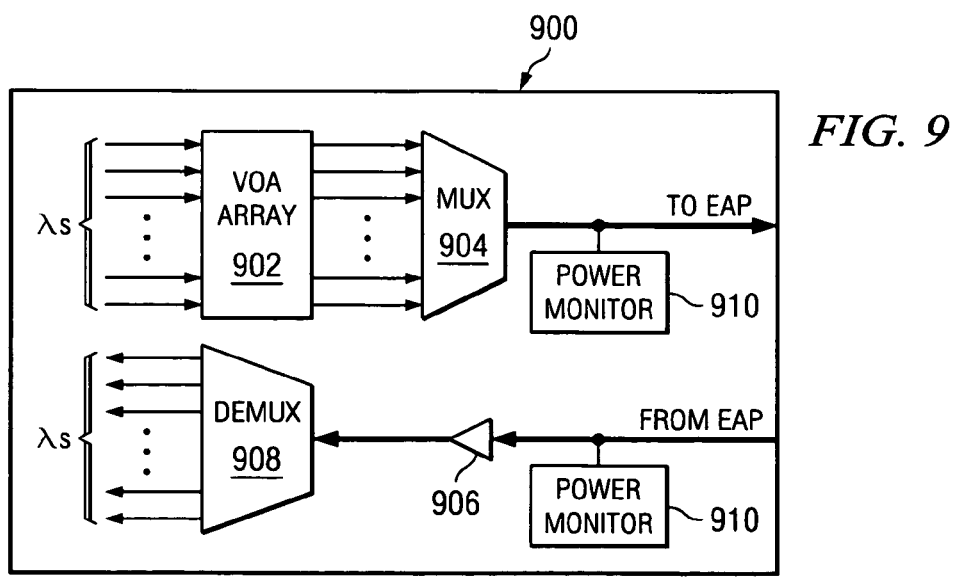
FIG. 9 illustrates one embodiment of an edge container aggregation component.

FIG. 9 illustrates one embodiment of an ECA 900. ECA 900 can receive signals from the working ECPs at a VOA array 902. In the example of FIG. 9, VOA array 902 can receive 40 λs. VOA array 902 can power balance the incoming signals using power-balancing techniques known in the art. After power balancing at the VOA array, the signals can be multiplexed at, for example, an arrayed wavelength granting ("AWG") multiplexer 904. For a signal received from the core, the signal can be amplified at an EDFA pre-amplifier 906 and demultiplexed into 40 λs at demultiplexer 908. The demultiplexed signals can be forwarded to the appropriate ECPs. ECA 900 can also include power monitors 910 to monitor the power of the signal traveling to/from the core.

Figure 10:
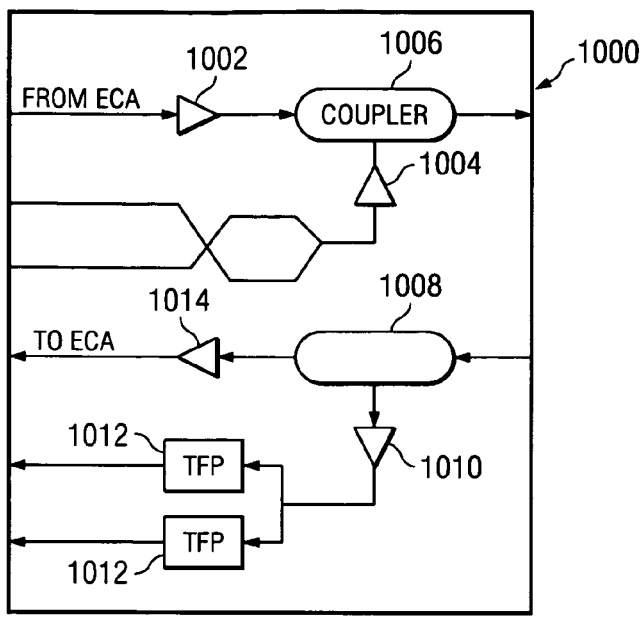
FIG. 10 illustrates one embodiment of an edge amplification and protection component.

FIG. 10 illustrates one embodiment of an EAP 1000. The embodiment of FIG. 10 assumes that only one sparing ECP is required and the total number of working ECPs is 20, each having two working wavelengths. EAP 1000 can receive a multiplexed optical signal from an ECA and boost the optical signal at boost amplifier 1002. In one embodiment of the present invention, the boost amplifier can be an EDFA amplifier, as would be understood by those of ordinary skill in the art. The sparing signals from the sparing ECP (e.g., the tunable protection ECP) can be multiplexed at an interleaver (not explicitly shown) and be power balanced at microAmp 1004. The multiplexed sparing signal can then be added to the signal from boost amplifier 1002 at coupler 1006. In another embodiment of the present invention, boost amplifier 1002 can be downstream of coupler 1006 and microAmp 1004 can be eliminated.

Depending on the upstream VOA array (e.g., VOA array 902 of FIG. 9), coupler 1006 can be a balanced or unbalanced ratio coupler. For example, if a VOA array exhibiting a 30 dB extinction ratio is employed, an 80/20 coupler can be used to add the multiplexed sparing signal to the outgoing signal from the VOA array. The precise ratio of the coupler can be based on the particular optical system architecture.

On the egress side, the sparing signal can be extracted from the multiplexed signal received from the optical core at an egress decoupler 1008. The sparing signal can be power balanced at microAmp 1010 and sent to tunable FP filters 1012 after demultiplexing. In another embodiment of the present invention, the sparing signal can be extracted from the main signal using an interleaver. The interleaver can allow the use of a small finesse FP filter (wide bandwidth) and reduce the need for microAmp 1010 to balance power on the sparing path. The main signal (i.e., the multiplexed working signals) can be amplified at pre-amplifier 1014 and sent to the ECA card for further demultiplexing. It should be noted that if pre-amplifier 1014 is located at the EAP, then pre-amplifier 906 of FIG. 9 can be eliminated from the ECA.

In another embodiment of the present invention an add/drop filter ("ADF") can be used to add/drop the protection signals from the main signal. In this embodiment, the sparing protection channels on the ingress side can be multiplexed at an interleaver and added to the already multiplexed working channels at the ADF. On the egress side, the sparing protection channels can be removed from the signal received from the core at the ADF. If each ECP supports two wavelengths, the ADF will drop two wavelengths from the signal received from the core. For this reason, wavelength groupings at the ECPs should, in the preferred embodiment, group odd and even wavelength numbers together.

The advantage of the EAP design of FIG. 10 is that the sparing path can be removed from the design of the normal working path. For the tunable solution, the light of both wavelengths from the failed ECP can be dropped and the light from the tunable sparing card can be multiplexed onto the outgoing fiber without a complicated switch array.

FIGS. 5–10 describe specific embodiments of an optical architecture, particularly the ingress and egress edge units. As can be understood from this discussion, an ingress edge unit, in one embodiment of the present invention, serves to transform a number of input data streams into time-division-multiplexed (TDM) and dense-wavelength-division-multiplexed (DWDM) signals that can be sent to the switch core and routed to the appropriate egress edge. Data arriving at the ingress edge unit in a plurality of streams can be aggregated and organized for transport to the appropriate egress edge unit. Containers within any given time slot are converted to signals of different wavelengths, and these containers are multiplexed into a single, multiple-wavelength signal (which may be referred to as a "yottlet"). The yottlets are then transmitted to the switch core for routing to the appropriate edge.

Figure 11:
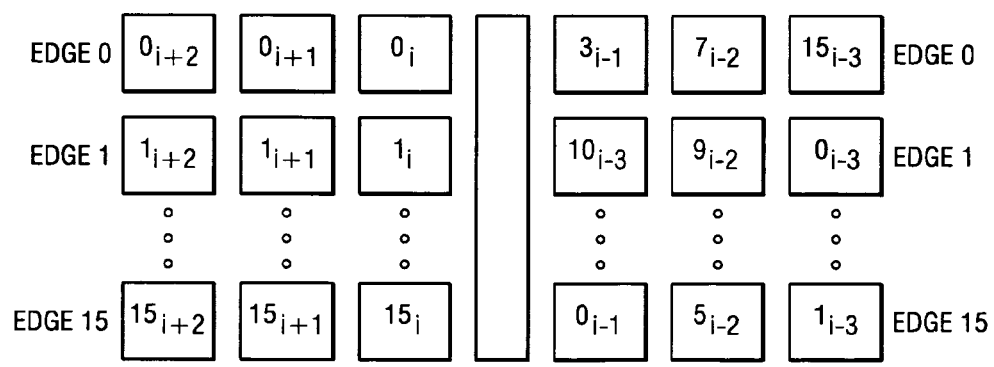
FIG. 11 is a diagram illustrating the switching of individual containers according to one embodiment of the present invention.

Referring to FIG. 11, a diagram illustrating the switching of individual containers of data in one embodiment is shown. It can be seen in this figure that there are 16 ingress edge units (numbered 0-15) and 16 egress edge units (also numbered 0-15). The containers generated by each ingress edge units are designated by the edge number (e.g., 0 for ingress edge 0). The subscript of each container's identifier indicates the timeslot in which the container is routed through the switch core. Thus, all of the containers having a given subscript are simultaneously routed through the switch core. The switch core is configured such that routing of the containers is non-blocking.

It can be seen that successive containers of a particular ingress edge can be routed to different egress edges, and successive containers received at a particular egress edge can originate at different ingress edges. For example, as shown in FIG. 11, egress edge 0 receives successive containers from ingress edges 15, 7 and 3. The schedule, in one embodiment of the present invention, is repeated every 125 microseconds, though it may be changed from time to time.

After each yottlet is routed through the switch core from a particular ingress edge to a particular egress edge, the signal is deconstructed in a reverse of the process carried out in the ingress edge. In other words, it is wavelength-demultiplexed, then the single-wavelength containers are sent to the appropriate edge container processors, where they are deconstructed into frames of data that are sent through the edge adaptation and grooming component to form the exiting data streams. This process is carried out in the egress edge (which may reside in an edge unit with an ingress edge).

Figure 12:
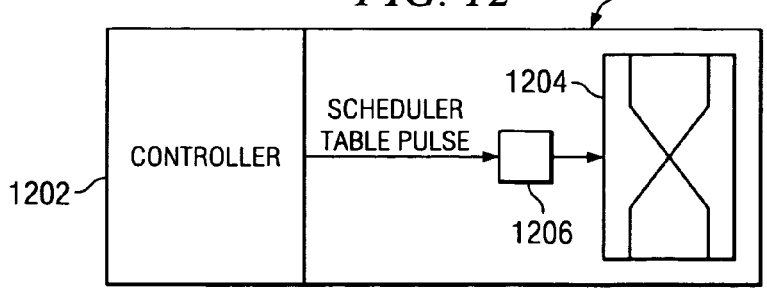
FIG. 12 illustrates one embodiment of a photonic core for non-blocking routing of data.

FIG. 12 illustrates one embodiment of a photonic core 1200 that can switch containers such as those described in the "Container Application" in a non-blocking manner. Photonic core 1200 can include a core management and control module 1202 and a switch fabric 1204. Core management and control module 1202 can propagate a scheduler table pulse with a built in delay that can be used by switch fabric module 1204 and the edge units to synchronize the transmission and routing of data. A switch clock 1206 can receive the scheduler table pulse to derive a container or data synchronization pulse that it propagates to a matrix of silicon optical amplifiers ("SOA") to control routing of data through switch fabric module 1204. It should be noted that while only one switch fabric module is shown in FIG. 12, multiple switch fabric modules can be controlled by a single core management and control module 1202. Moreover, each switch fabric module can have its own switch clock or can share a common switch clock.

FIG. 13 is a diagrammatic representation of one embodiment of a switch fabric 1300 according to the present invention. For the sake of simplicity, a 4×4 switch fabric is illustrated. This means that switch fabric 1300 can receive optical signals from four ingress edge units and transmit data to four egress edge units via an SOA array 1310. Accordingly, there are four inputs and four output to switch fabric 1300 (excluding inputs and outputs for control and clock signals). Each input can be connected to an input core signal interface ("CSI") (e.g., input CSIs 1321-1324) that can broadcast the signal from each input to an SOA grouping (e.g., SOA groups 1331-1334) with each SOA group having one SOA associated with each potential output. In the case of a four-output switch fabric, each input CSI can act as a 1 to 4 splitter, operable to forward and input signal to four SOAs. The individual SOAs in FIG. 13 are designated $SOA_{n,m}$, with n corresponding to the input and m corresponding to the output. Signals can be routed from the SOAs to output CSIs (e.g., output CSIs 1341-1344) and from the output CSIs to egress edge units.

Figure 14A:
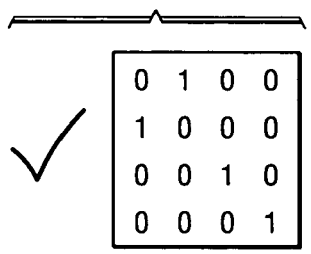
FIG. 14A illustrates a valid switching pattern for the switch fabric of FIG. 13.
Figure 14B:
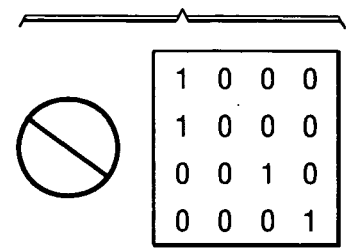
FIG. 14B illustrates an invalid switching pattern for the switch fabric of FIG. 13.

A clock signal 1350 can drive SOA array 1310 to switch data from inputs to outputs in a non-blocking fashion. At any given time slot only one SOA in a given SOA group will be in an ON state and no two SOAs corresponding to the same output will be ON. In other words, for a given time slot, each SOA in the ON state will have a different m and n. This is illustrated in FIGS. 14A and 14B. SOA array 1310 can be mapped to a 2-D n×m matrix for a given time slot. FIG. 14A illustrates a valid switching pattern in which only one SOA in a SOA group is ON for a given time slot. FIG. 14B, however, illustrates an invalid switching pattern as both $SOA_{1,1}$ and $SOA_{2,1}$ are ON. This means that both of these SOAs are attempting to transmit data to the same output in the same time slot, resulting in blocking. In another embodiment of the present invention, however, two SOAs with the same n can transmit data in the same time slot. In other words, data from a single input can be transmitted to multiple outputs so long as no other input is connected to those outputs in the same time slot. This can allow multicasting of data from a single ingress edge unit to multiple egress edge units.

Thus, the switch fabric can comprise multiple inputs and multiple outputs with each input being connected to each output via a path switch (e.g., an SOA). The SOAs can be driven by a clock signal to create a set of unique (i.e., non-blocking) paths through the switch fabric from the inputs to the outputs by selectively connecting each input to a different output than any of the other inputs are connected in a given time period. In this manner, containers (or other time based data structures such as packets) received from ingress edge units at a particular time slot can be routed to egress edge units without contention. In the next time slot the connections can changed. Because the switch fabric is driven by a schedule, an optical to electrical conversion does not have to occur at the switch fabric. Consequently, switching can occur on a nanosecond level.

Figure 15A:
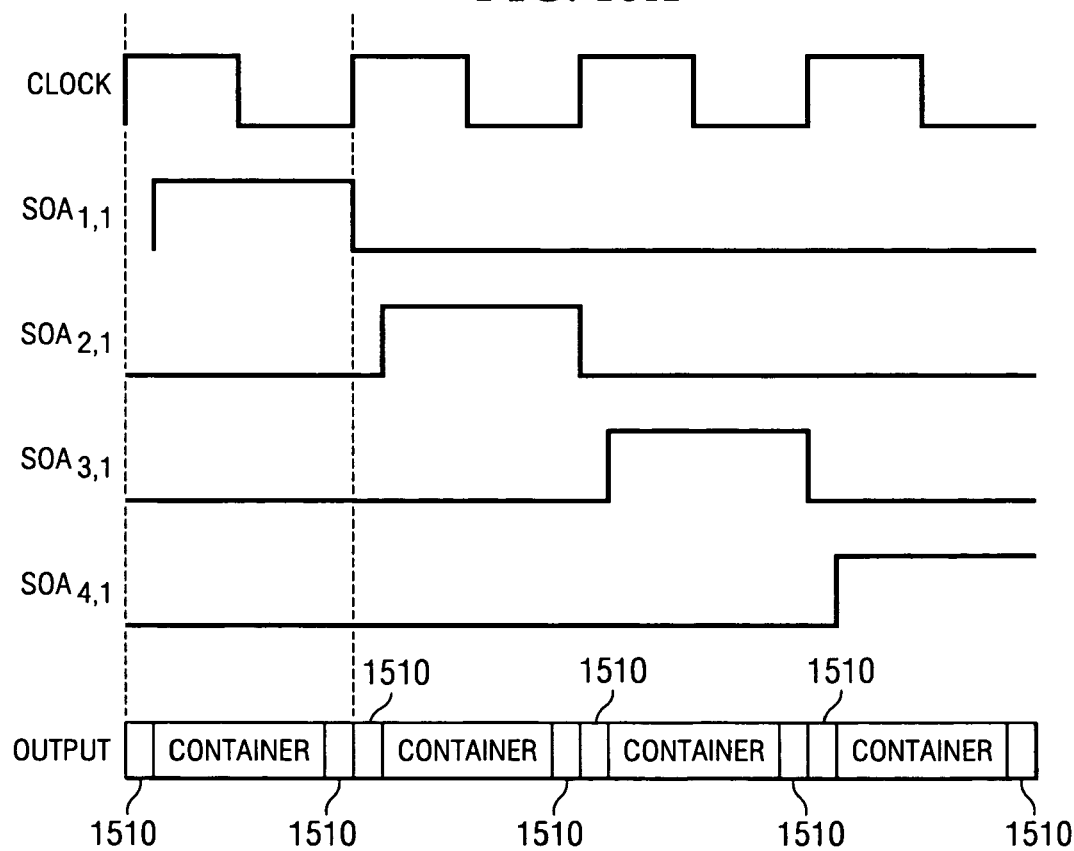

FIGS. 15A and 15B illustrate examples of different manners of driving the SOA array at a switch fabric. The ON state of each of $SOA_{1,1}$, $SOA_{2,1}$, $SOA_{3,1}$ and $SOA_{4,1}$ of FIG. 13 is illustrated relative a particular clock pattern. In the Example of FIG. 15A a gap time is realized by inserting an extra training pattern 1510 after or before each container. In one embodiment of the present invention, insertion of the training pattern can occur at the edge units. In the embodiment of FIG. 15B, the ON state for an SOA can also be made shorter than the clock period.

With the first approach, the utilization of SOA switching speed is the most. Under the certain amount of variation of the arriving time of a container, the probability of truncation of a container is the smallest. However, once the container is truncated, it will also damage the adjacent container due to the limited rising and fall of an SOA. Furthermore, this approach cannot prevent overlap between two SOAs' ON windows due to the skew of drivers. With the second approach, these problems can be eliminated by making the ON period shorter than the clock period. In other words, the time slot (i.e., the period that a particular SOA is ON) is shorter than the clock period corresponding to that time slot. The preliminary gap time, in the preferred embodiment of the present invention is 4 ns.

Figure 16:
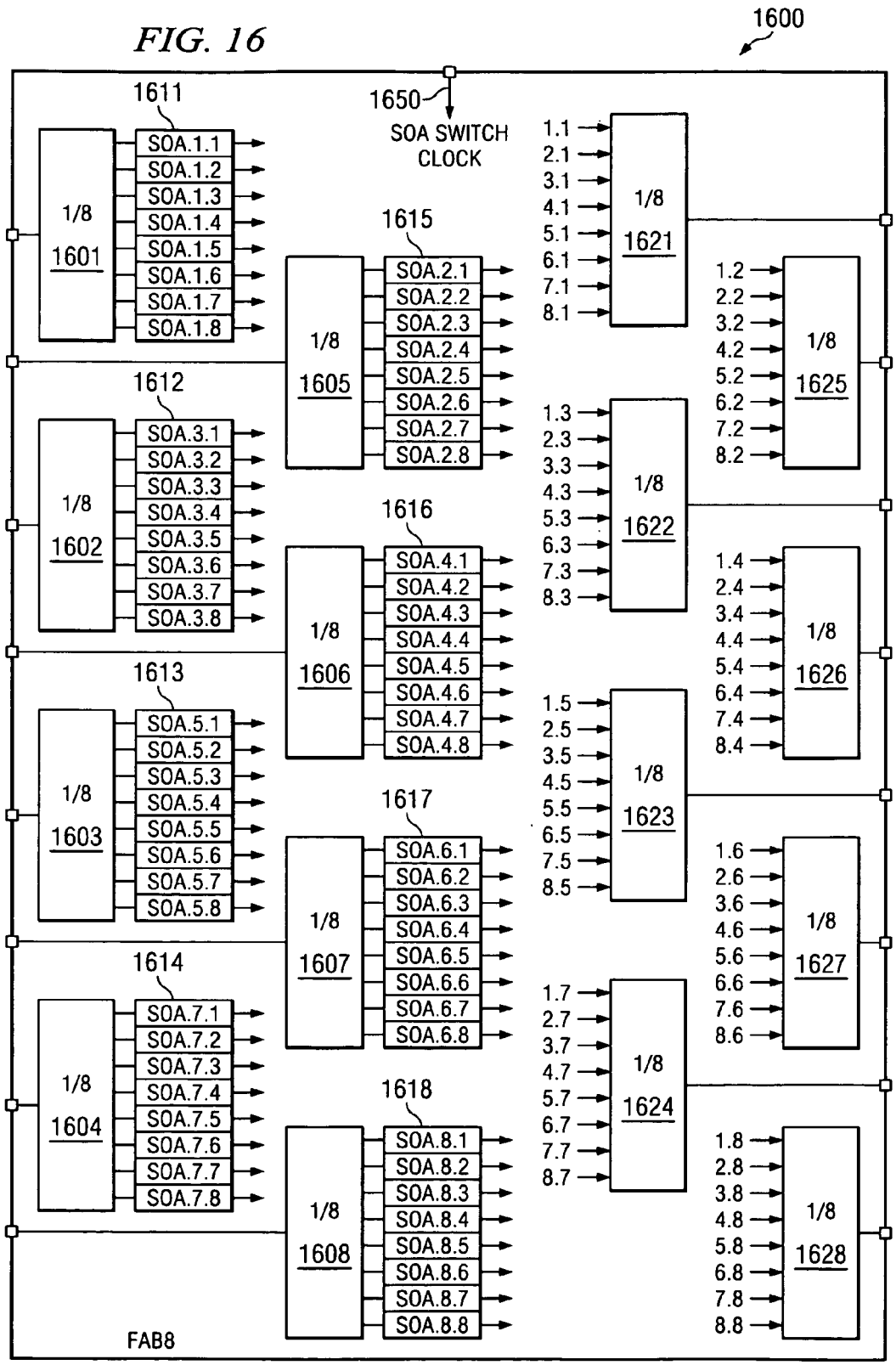
FIG. 16 is a diagrammatic representation of one embodiment of an 8×8 switch fabric.

An 8×8 switching fabric can be constructed in a similar manner to a 4×4 switch fabric. FIG. 16 illustrates an 8×8 switching fabric 1600 that can connect 8 inputs to 8 outputs in a non-blocking manner. Switch fabric 1600 can include 1 to 8 splitter CSIs 1601-1608 connected to SOA groups 1611-1618 further connected to 1 to 8 combiner output CSIs 1621-1628. For the sake of simplicity, the output CSIs are shown as disjoint from the SOA groups. However, it should be understood that, in this embodiment of the present invention, the each output CSI is connected to an SOA from each SOA group and no SOA is connected to more than one CSI. As with the 4×4 switch fabric, the 8×8 switch fabric can be driven by a clock signal (e.g., clock signal 1650). By coordinating the ON states of the SOAs in switch fabric 1600, switch fabric 1600 can route data from inputs to outputs in a non-blocking manner. This can be achieved in any time slot by having only one SOA connected to a particular output CSI in an ON state. In other words, non-blocking switching of data can occur so long as no two inputs are connected to the same output in a given time slot.

Figure 17:
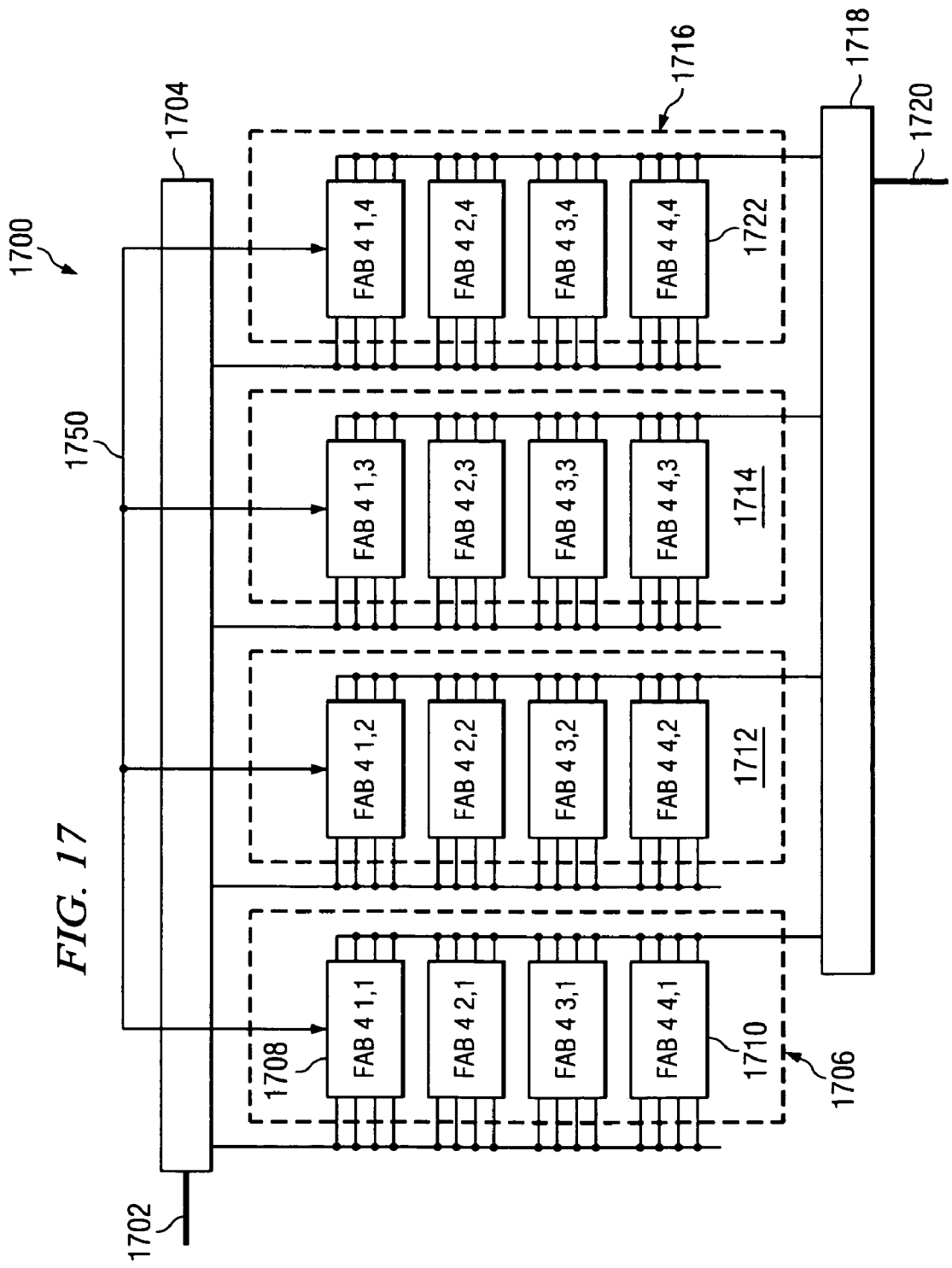
FIG. 17 is a diagrammatic representation of one embodiment of a 16×16 switch fabric.

FIG. 17 illustrates one embodiment of a 16×16 switch fabric 1700. In this embodiment, data from sixteen ingress edge units can be routed to sixteen 4×4 switch fabrics, such as that described in conjunction with FIG. 13. Switch Fabric 1700 can include a 16 fiber input 1702 carrying data from each of the sixteen ingress edge units. The signals on each of the 16 fibers can be split into four copies at an input CSI 1704. The first copy can be routed to the first FAB 4 group 1706 with the first signal being directed to the first input of FAB 4 module 1708, the second signal being directed to the second input of FAB 4 module 1708 and so on with the sixteenth signal being directed to the fourth input of FAB 4 module 1710. Each of the FAB 4 modules in FAB 4 group 1706 can connect its inputs to the same four egress edge units.

The second copy of the input signal can be directed to FAB 4 group 1712, the third copy to FAB 4 group 1714 and the fourth copy to FAB 4 group 1716. As with FAB 4 group 1706, the signals in the remainder of the groups can be directed to the FAB 4 modules as in FAB 4 group 1706, with the first signal being directed to the first input of the first FAB 4 module in the group and the sixteenth signal being directed to the last input of the last FAB 4 module in the group. Each FAB 4 module in each FAB 4 group can route data to the same four egress edge units. At output CSI 1718, the multiple outputs from each FAB 4 group can be reduced to a single fiber, such that the output signals can be carried to the egress edge units on a 16 fiber bus 1720.

To achieve non blocking routing of data in switch fabric 1700 a clock signal 1750 can be used to coordinate the ON/OFF status of each SOA in a FAB 4 module. In a particular FAB 4 group, no two SOAs associated with the same egress edge unit can be ON at the same time, even if the SOAs are located at different FAB 4 modules. For example, if $SOA_{1,1}$ at FAB 4 module 1708 and $SOA_{1,1}$ at FAB 4 module 1710 are associated with the same egress edge unit (i.e., connect to the same output of fiber bus 1720), then these two SOAs could not be ON at the same time without blocking. However, since FAB 4 module 1722 is associated with a different set of egress edge units than FAB 4 module 1708 (i.e., they are in different FAB 4 groups), then $SOA_{1,1}$ of FAB 4 module 1708 and $SOA_{1,1}$ of FAB 4 module 1722 can be ON in the same time slot without causing blocking as they are connected to different overall outputs.

FIG. 18 illustrates another embodiment of a 16×16 switch fabric 1800 in which four FAB 8 modules are used, as opposed to the sixteen FAB 4 modules of FIG. 17. In the embodiment of FIG. 18, the switch fabric can comprise four 8×8 switch fabrics (e.g., FAB 8 1801-1804). Switch fabric 1800 can receive containers from sixteen ingress edge units on an ingress bus 1806 and communicate the containers to sixteen egress edge units via egress bus 1808. An ingress CSI 1809 can split the incoming signals into two copies and direct the first copy to FAB 8 group 1810 and the second copy to FAB 8 group 1811. In each copy, the first 8 containers go to the first FAB 8 in the group and the second 8 containers go the second FAB 8. Thus, for example, the first fiber connected to group 1810 goes to the first input of the first FAB 8 in FAB 8 group 1810 and the sixteenth fiber connected to FAB 8 group 1810 goes to the last input of the second FAB 8 in FAB 8 group 1810. In the preferred embodiment of the present invention, FAB 8 group 1810 can route data to the first eight egress edge units and FAB 8 group 1811 can route data to the second eight egress edge units. Each FAB 8 will have eight outputs, meaning that there are thirty-two outputs in total. Output CSI 1812 can combine the thirty-two FAB 8 outputs into sixteen outputs for transmission on a sixteen-fiber output bus 1808. Non-blocking routing of data in switch fabric 1800 can be achieved by coordinating the ON state of SOAs at each of the FAB 8s. Non-blocking routing will occur so long as no two SOAs associated with the same egress edge unit are ON in the same time slot.

Thus, the switch fabric 1800 can receive data on sixteen inputs, selectively connect each of the inputs to an output through a matrix of FAB 8s, such that no two inputs are connected to the same output in a time slot, and send the data to the egress edge units across sixteen outputs. Coordination of SOA states can be based on a clock signal 1830. The clock signal establishes a schedule for each SOA in the switch fabric to be ON. During a particular time slot in the schedule, no two SOAs associated with the same egress edge unit will be ON in the same time slot. Clock signal 1830 can be derived based on information from the data received at the edge units or be arbitrarily established. However, since the SOAs are driven by the clock signal, no optical to electrical conversion has to occur at the photonic core itself, allowing switch fabric 1800 to switch connections on a nanosecond basis. Coordination of switch fabric 1800 and the edge units can be achieved as described in conjunction with FIGS. 21-25.

Figure 19:
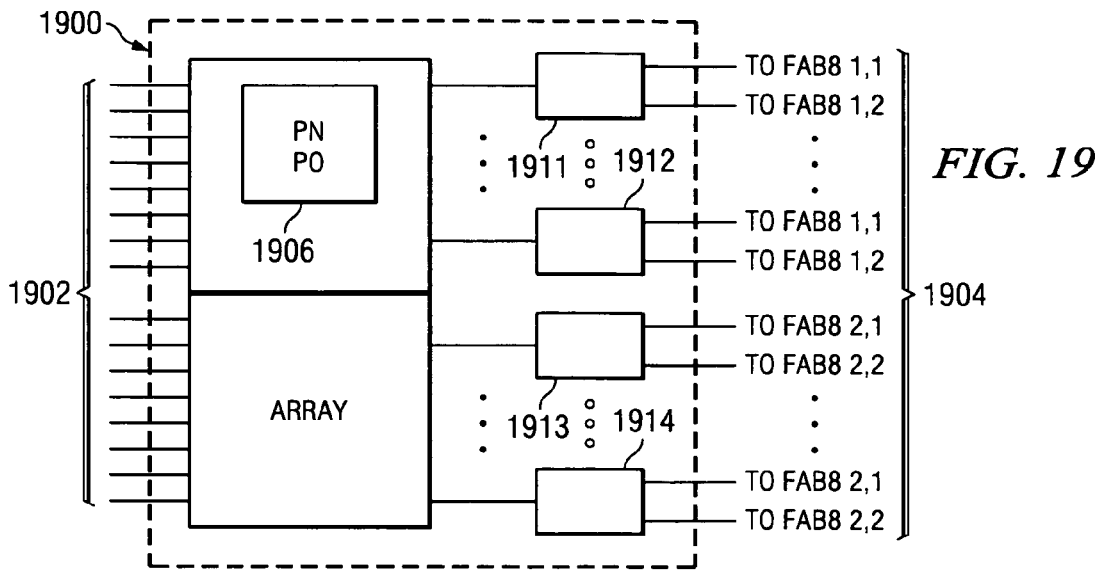
FIG. 19 is a diagrammatic representation of one embodiment of a core signal interface.

FIG. 19 illustrates one embodiment of an input CSI 1900 for a 16×16 switch fabric using four FAB 8s, as described in conjunction with FIG. 18. Input CSI 1900 has sixteen inputs 1902 for receiving signals from ingress edge units and thirty-two outputs 1904 for routing data to the two FAB 8 groups. Signals can be copied from each input to two outputs using, for example, a 50/50 splitter (e.g., splitters 1911-1914). Input CSI 1900 can include a power monitor array 1906 (e.g., a tap-PIN array) to detect incoming signal failure to the switch fabric. The functioning of the output CSI is the opposite of the input CSI. A power monitor array in the output CSI can be used to detect connectivity failure in the core. If switching is done on a container-by-container basis, the power monitor arrays can receive the clock signal to know when they should be detecting power on a particular fiber.

Figure 20:
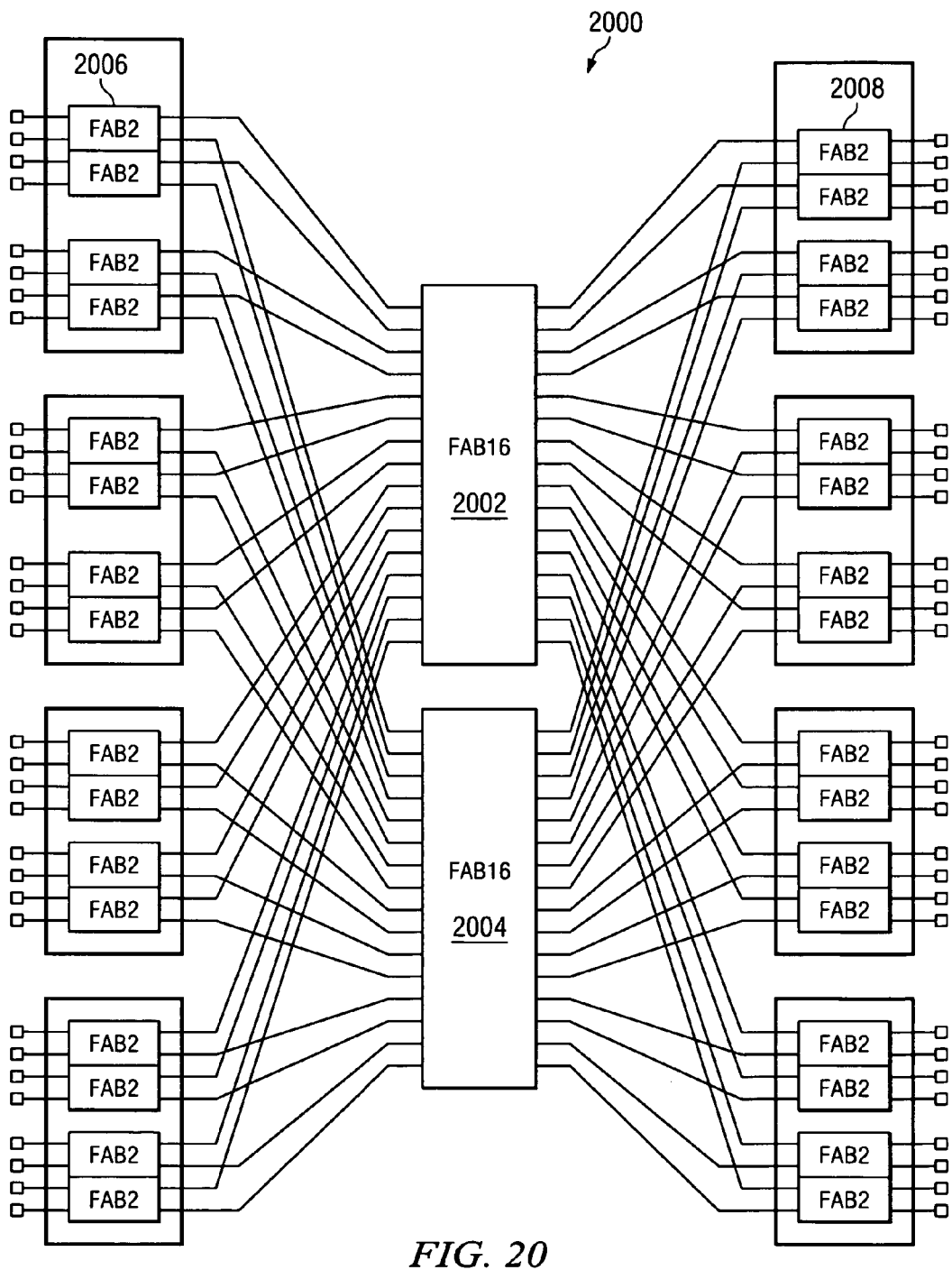
FIG. 20 is a diagrammatic representation of a 32×32 switch fabric.

FIG. 20 illustrates one embodiment of a 32×32 switch fabric 2000 for, for example, a 10 Tbps Clos network. Switch fabric 2000 can include 32 inputs and 32 outputs. Each input can be routed to one of two FAB 16s (FAB 16 2002 and FAB 16 2004) by an input FAB 2 (e.g., FAB 2 2006) and an output from a FAB 16 can ultimately be routed to an egress edge unit by an output FAB 2 (e.g., FAB 2 2008). The embodiment of FIG. 20, thus, uses a three-stage architecture and illustrates that larger and larger switch fabrics can be constructed using smaller switch fabrics as building blocks. As the switch fabric becomes arbitrarily large, however, optimization of targets in a Clos network can depend on the total number of SOAs and the end-to-end insertion loss.

With respect to the total number of SOAs for an N×N switch fabric, if the front-end stage is based on n inputs and k outputs, the number of front-end arrays must be N/n. The center stage will be a fabric array based on N/n×N/n, with the array size of k. Thus, for example, the center stage FABs in FIG. 20 are 16×16 switch fabrics (i.e., 32/2×32/2) and there are two of them (i.e., k=2). For rearrangeable non-blocking, k must equal n. Rearrangeable non-blocking means that the switch fabric can always set up a connection from any input to any output as far as that particular output is available, however, to setup a new connection, the other connections may have to be rearranged as well. The number of SOAs in a Clos network switch fabric is dictated by equation one below.

$$M=2(N/n)(nk)+k(N/n)^2 \quad \text{[EQ. 1]}$$

For rearrangeable non-blocking where n=k:

$$M=2Nn+N^2/n \quad \text{[EQ. 2]}$$

Therefore, for the minimum number of SOAs, n should be:

$$n=(N/2)^{0.5}=4 \quad \text{[EQ. 3]}$$

Thus, for the minimum number of SOAs and to achieve rearrangeable non-blocking, the 32×32 switch array should have 8 front and back end FAB 4s and four FAB 8s at the center. Thus, the embodiment of FIG. 20 uses more SOAs than are required for a three stage 32×32 switch fabric.

However, optimization of the 32×32 Clos network switch fabric also depends on the insertion loss. In general, the insertion loss will increase with n, such that a 2-16-2 system, such as that shown in FIG. 20 will have a lower insertion loss than a 4-8-4 system. Table 1 provides examples of various system architectures to achieve optimization for different bandwidths. For example, for a 10 Tbps 32×32 system, the switch fabric can have one 32×32 center stage with no input or output stages and 1024 SOAs or two 16×16 center stages, sixteen input stages (i.e., FAB 2s), sixteen output stages (i.e., FAB 2s) and 640 SOAs. The first configuration is optimized to minimize insertion loss while the second configuration is optimized to minimize the number of SOAs and, hence, cost and size of the system.

TABLE 1

| System Size (Tbps) | I/O Stage Unit Size | Center Stage Unit Size | Number of Center Stages | Number of Input Stages | Number of Output Stages | Number of SOAs |
|---|---|---|---|---|---|---|
| 5 (16 × 16) | 1 | 16 × 16 | 1 | NA | NA | 256 |
| 10 (32 × 32) | 1, 2 | 32 × 32, 16 × 16 | 1, 2 | 0, 16 | 0, 16 | 1024, 640 |
| 20 (64 × 64) | 2, 4 | 32 × 32, 16 × 16 | 2, 4 | 32, 16 | 32, 16 | 2304, 1536 |
| 40 (128 × 128) | 4, 8 | 32 × 32, 16 × 16 | 4, 8 | 32, 16 | 32, 16 | 5120, 4096 |

Embodiments of the present invention provide a system of switching data in a photonic core in a non-blocking manner. The photonic core can comprise a plurality of inputs, a plurality of outputs and a plurality of path switches (i.e., SOAs) operable to selectively connect the inputs in a non-blocking fashion. In other words, the path switches can connect each input to an output that is not connected to another input in a particular time interval. The photonic core can include a monolithic switch fabric or a switch fabric composed of a number of smaller switch fabrics (potentially arranged in stages). Connections between inputs and outputs are driven by a clock signal. Therefore, optical to electrical conversion of data does not have to occur at the photonic core and the core can switch at nanosecond speeds. This provides a substantial advantage over prior art systems that were slowed down by performing optical to electrical conversions at the cross connects.

Figure 21:
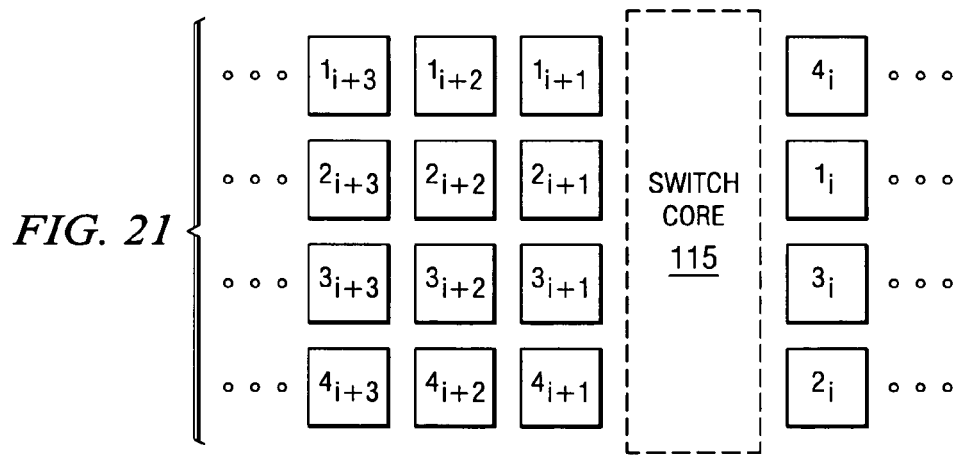
FIG. 21 is a diagram illustrating the routing of successive sets of containers through a switch core at a first time in one embodiment.
Figure 22:
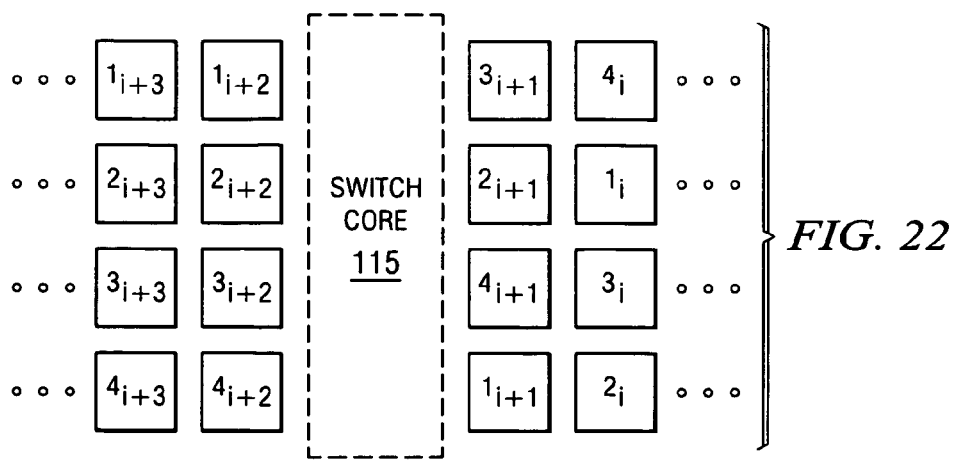
FIG. 22 is a diagram illustrating the routing of successive sets of containers through the switch core in the embodiment of FIG. 3, wherein the last set of containers routed through the switch core ($1_{i+1}$ through $4_{i+1}$) were routed according to the connections shown in FIGS. 2-3.

As discussed earlier, synchronization of edge units and the core can occur in a variety of manners. Referring to FIGS. 21 and 22, and with reference to FIGS. 2-3, a pair of diagrams illustrating the switching of successive sets of containers according to different sets of edge-to-edge connections is shown. In these figures, the containers from a first ingress edge are designated by a 1, containers from a second ingress edge are designated by a 2, and so on. Successive containers are designated by subscripts i, i+1, and so on. All of the containers with the same subscript fall within the same time slot and are received and transmitted by the switch core at the same time.

In FIG. 21, a first set of containers (designated by the subscript i) have been transmitted through the switch core. If the connections identified in FIGS. 2 and 3 are established and the next container set (designated by the subscript i+1) is transmitted through the switch core, the arrangement of transmitted containers shown in FIG. 22 will result.

While it is evident from these FIGURES that each successive data container received from a given ingress edge may be delivered to a different one of the egress edges, it can also be seen that the containers must arrive at the switch core at the proper time in order to be routed to the proper destination. At a very coarse level, the edge units perform distribution and framing synchronization. That is, they synchronize the data by placing the appropriate data in appropriate containers. At a finer level, it is necessary to ensure that the containers are transmitted from the edges at the appropriate times so that they arrive at the switch core within the window during which the proper connections are established. This is a problem that is not encountered in conventional systems because they do not perform schedule-based switching. The synchronization systems and methods of the present invention address the latter, finer level of synchronization.

Figure 23:
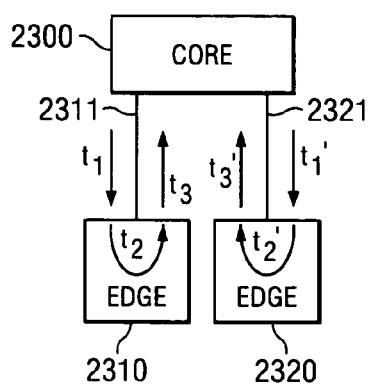
FIG. 23 is a diagram illustrating the interconnection of a plurality of ingress edges with a switch core in one embodiment.

Referring to FIG. 23, a diagram illustrating the interconnection of a plurality of ingress edges with a switch core in one embodiment is shown. While only two ingress edges are explicitly depicted in the figure, there may be additional ingress edges connected to the switch core. In one embodiment, the switch core is connected to 16 ingress edges.

Switch core 2300 of FIG. 23 is connected to ingress edge 2310 by one or more optical fibers 2311. Likewise, Switch core 2300 is connected to ingress edge 2320 by one or more optical fibers 2321. (Switch core 2300 is also connected to at least one egress edge, but this is not depicted in the figure because the data received by the egress edges need not be synchronized.) When data such as a synchronization pulse is sent to edge 2310, the data takes a certain amount of time ($t_1$) to travel from switch core 30 to the edge. Edge 2310 then takes a certain amount of time ($t_2$) to respond to the received data and to convey the responsive data to optical fiber 2311 for transport to switch core 2300. Finally, it takes a certain amount of time ($t_3$) to travel along the length of fiber 2311 before reaching switch core 2300. Thus, if a synchronization pulse is sent out by switch core 2300, the responsive data will be received from edge 2310 at a time ($t_1+t_2+t_3$) later.

The same is true of data transfers between switch core 2300 and edge 2320, except that the connection between them may not be identical to that between the switch core and edge 2310. Consequently, times $t_1'$, $t_2'$ and $t_3'$ may not be the same as times $t_1$, $t_2$ and $t_3$. The total time ($t_1'+t_2'+t_3'$) may therefore be different, and the arrival times of data from the two edges in response to the same synchronization pulse may be different. In other words, the data will not be synchronized.

Because times $t_1$, $t_1'$, $t_2$ and $t_2'$ are dependent upon the physical configuration of the core-edge connections, they cannot simply be altered to match each other. $t_2$ and $t_2'$, on the other hand, are dependent upon the processing that occurs in the respective edges when the synchronization pulse is received. The processing can therefore be manipulated to adjust times $t_2$ and $t_2'$. In other words, this part of the delay is programmable.

The present embodiment takes advantage of the programmability of the edges' internal delays to synchronize their responses to a synchronization pulse. This is accomplished by setting the internal delays of the edges (e.g., $t_2$ and $t_2'$) so that the total delay $t_D$ ($=t_1+t_2+t_3$) for each edge is equal to a predetermined value. If it is known that the total delay for each edge is $t_D$, then a single synchronization pulse transmitted to each of the edges at a first time will cause data responsive to the synchronization pulse to be received from each edge at a second time, $t_D$ later.

Since the internal, programmable delay ($t_2$) needs to be separately determined and set for each ingress edge, one embodiment provides an automatic calibration mechanism. This mechanism is implemented independently within each ingress edge. The mechanism is operational during an initialization period that may occur when the edge is connected to the switch core, when the system is booted, or at other appropriate times. For the purposes of the following description of the automatic calibration mechanism, it will be assumed that the internal delay is calibrated when the edge unit is initialized after being connected to the switch core.

When the edge unit is first connected, it is not included in the switching schedule. In other words, the other ingress edges are not scheduled to transfer any data to the new egress edge, and the other egress edges are not scheduled to receive any data from the new ingress edge. The new edge unit can therefore test itself by attempting to send data from its ingress edge to its egress edge. If the new ingress edge is synchronized with the switch core, the data will be successfully transferred to the new egress edge. If the new ingress edge is not synchronized with the switch core, the attempted transfer will not be successful.

Figure 24:
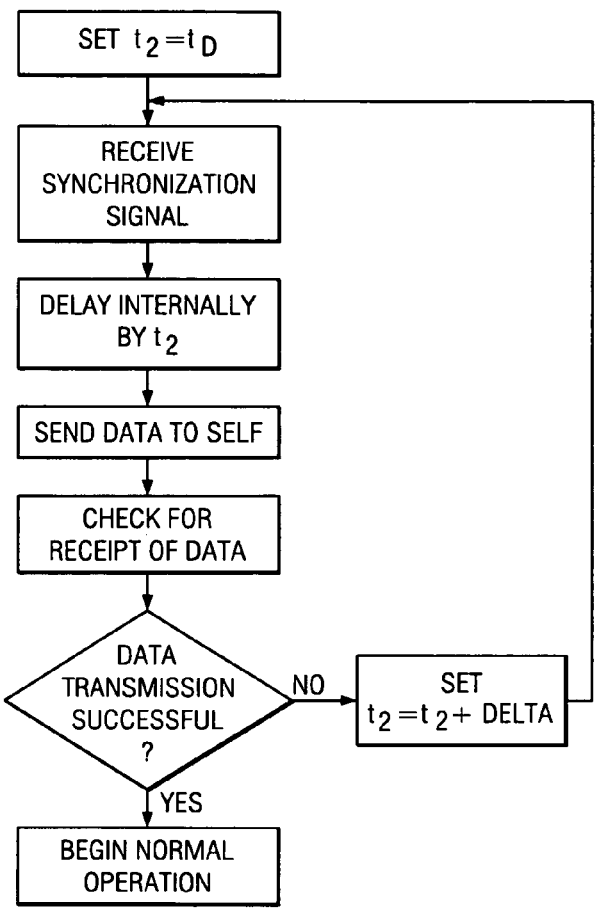
FIG. 24 a flow diagram illustrating the procedure used to automatically calibrate the proper internal delay ($t_2$) for synchronization in one embodiment.

Referring to FIG. 24, the procedure used to determine the proper internal delay ($t_2$) for synchronization is as follows. First, $t_2$ is set to the greatest possible value it may have. Since the internal delay can be no more than the total delay, $t_2$ is set equal to $t_D$. (While $t_1$ and $t_3$ are assumed to have a non-zero delay, and the maximum possible value for $t_2$ is therefore less than $t_D$, $t_2$ is nevertheless set to $t_D$ in this embodiment for the sake of simplicity.) With $t_2$ set to $t_D$, the ingress edge waits for a synchronization pulse from the switch core. When the synchronization pulse is received, the new edge unit's ingress edge waits for the period $t_2$ and then transmits the data that is to be transferred. The new edge unit's egress edge then waits for the data.

If the data sent from the new ingress edge is successfully received by the new egress edge, the internal delay is set to the correct value. The edge unit therefore proceeds with its remaining initialization procedures, if any, and begins normal operation. If, on the other hand, the data is not successfully received by the egress edge, the internal delay is determined to be too long, and is decreased by an incremental amount. The new ingress edge then attempts to transmit data to the new egress edge using the decremented internal delay. This process is repeated until the internal delay is set at a value at which data is successfully transferred from the ingress edge to the egress edge.

There may be a number of variations of this process. For example, as noted above, the initial internal delay may be less than the total delay, $t_D$. In an alternative embodiment, the initial internal delay may be set at a minimum value and may be incremented upward (to longer delays) instead of downward in successive iterations. It should also be noted that, in this embodiment, the calibration of the delays occurs only during the initialization period, rather than periodically. The total delay may change as a result of, for example, changes in the temperature of the optical fibers connecting he the edge to the core. In the preferred embodiment, these variations are designed into the timing tolerances, but other embodiments may perform periodic recalibration to account for such changes in delays.

Figure 25:
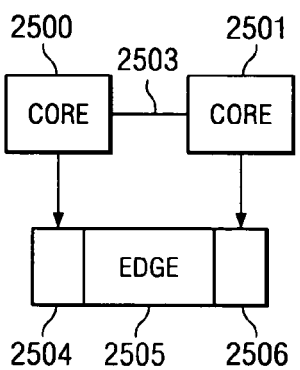
FIG. 25 is a diagram illustrating the interconnection between primary and secondary switch cores and an edge unit in one embodiment.

Referring to FIG. 25, a diagram illustrating the interconnection between primary and secondary switch cores and an edge unit in one embodiment is shown. In a preferred embodiment of the optical data switching system in which the present systems and methods are implemented, there are two switch cores: a primary switch core 2500 that performs the switching functions of the system under normal circumstances; and a secondary switch core 2501 which is redundant and which can take over the functions of the primary core when the primary fails. Even though this second switch core serves as a backup to the primary switch core, it is necessary to maintain synchronization between the two cores in order to allow the secondary core to maintain operation of the system without loss of data when the primary core fails. Each of the switch cores is coupled to a synchronization component (2504,2506) in the edge unit 2505.

The two switch cores have a master-slave relationship. The slave (secondary) switch core 2501 is configured to receive a synchronization signal from the master (primary) switch core 2500 via coupling fiber 2503. Master switch core 2500 is itself configured to lock on to one of two synchronization inputs which are external to the core. The master switch core uses this synchronization input to control its STS-N signal generator. The master switch core uses this framing structure as the mechanism for generating a scheduler table synchronization pulse that controls the use of particular switching schedule tables. Because the master and slave switch cores may be remotely located from each other, the scheduler table synchronization pulse generated by the slave core may lag behind that of the master core. Since each of the switch cores transmits its own scheduler table synchronization pulse to each of the edge units, there may be a discrepancy between the scheduler table synchronization pulses at each of the edge units. (Differences in optical fiber lengths may also contribute to the discrepancies.)

Figure 26:
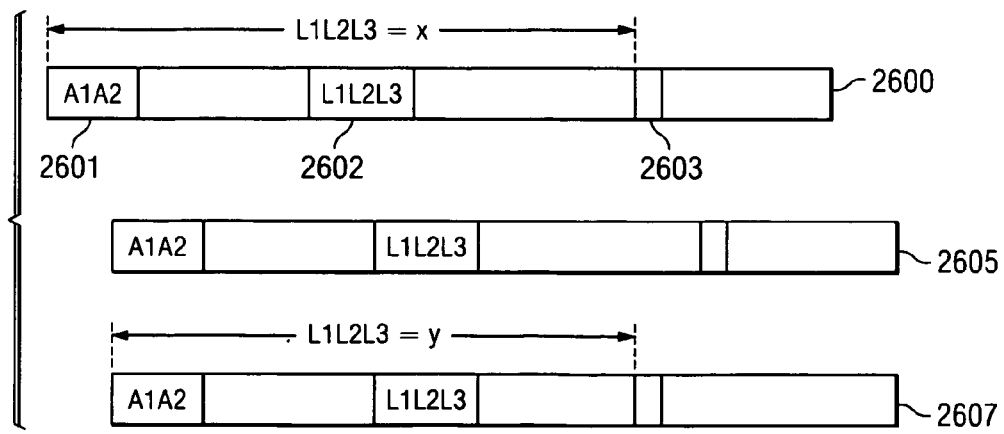
FIG. 26 is a diagram illustrating the structure of a synchronization pulse frame as used in one embodiment.

The mechanism provided in one embodiment is based on a pointer in the scheduler table synchronization pulse frame. The structure of this frame in one embodiment is shown in FIG. 26. It can be seen from this figure that the beginning of frame 2600 is identified by the A1A2 octets 2601. The frame also includes three overhead octets L1L2L3 2602. These octets serve essentially as a pointer to the scheduler table synchronization pulse 2603 (as measured from the beginning of the frame.) The master switch core sets L1L2L3 to a value x. Because the slave switch core will receive this frame with a certain delay after the master switch core transmits it (as shown by frame 2605), and will then send out its own synchronization pulse frame, the slave switch core is configured to adjust the value of L1L2L3 to account for the delay (as shown by frame 2607). Thus, the slave switch core sets L1L2L3 to y, where x-y is the number of bit times by which the synchronization pulse frame is delayed in the transmission from the master switch core to the slave switch core. In the preferred embodiment, this number of bit times is set within the switch to a predetermined value to correspond to the delay associated with the manufacturer-supplied interconnection between the switch cores. The result of the pointer (L1L2L3) adjustment is that the scheduler table synchronization pulse 2603 occurs at the same time according to synchronization pulse frames received from each of the switch cores.

Another synchronization issue that arises in the switching system described above is that communications between the switch cores may fail. From the perspective of the slave switch core (since the master switch core does not care what the slave does), the loss of communications from the master may indicate either that the master switch core itself has failed, or that the master switch core is still operational, but the communications link between them has failed. In the former case, the edge units should synchronize to the signals from the slave. In the latter case, the edge units should continue to synchronize to the signals from the master. The question is what indication the slave should transmit to the edge units when it loses communications from the master.

In some prior art systems, a "normal" signal was transmitted to the edge units to indicate that both the master and slave switch cores are functioning properly and that the edge units should synchronize to the master. A "do not use" or "DUS" signal was transmitted to the edge units to indicate that the master had failed and that the edge units should synchronize to the slave. In the present systems and methods, an additional signal is used to indicate that the slave has lost communication with the master, but that the edge units should continue to synchronize to the master unless it has failed, in which case they should synchronize to the slave switch core. This signal is referred to as a "do not use unless other fails" or "DUS UOF" signal. When the slave switch core loses communications from the master switch core, it sends out a "DUS UOF" signal to all of the edge units. Upon receipt of this signal, each edge unit determines whether the master switch core is still available for synchronization. If so, then they synchronize to it. If not, they synchronize to the slave.

Another synchronization issue that arises in the operation of this system concerns the distribution of synchronization pulses within the edge units. The components within the edge units (e.g., edge data interfaces, edge container processors, etc.) run off of internally generated synchronization pulses. Each of the edge units has a PLL that locks on to the synchronization pulse in the synchronization pulse frame (whether the synchronization pulse is received from the master switch core or the slave). The output of the PLL is distributed to the various components of the edge unit to enable the processing of the data for transfer to the switch core. A phase comparator is used to determine the phase difference between the received synchronization pulse and the locally generated signal. The output of the phase comparator is input to a voltage controlled oscillator to speed up or slow down the locally generated signal.

Still another synchronization issue concerns the switching of schedule tables. As described above, the switching system in which a preferred embodiment is implemented comprises an all-optical switch that routes optical data signals according to a particular routing schedule. In other words, a plurality of timeslots are defined for the switch core, and a certain set of connections are required for each timeslot. Then, the data that arrives at the switch core during a given timeslot is routed according to the connections that are in effect during that timeslot.

Because the demand for data transfers between a certain set of ingress edges and egress edges may change over time, the schedule of connections that will be implemented in each timeslot may be periodically redefined. Consequently, it will periodically be necessary to compute a new routing schedule and to switch from the previous schedule to the new schedule (so that data will be routed to the new schedule). One embodiment of the system therefore implements a mechanism for synchronizing the switching of schedule tables as described below.

In this system, the schedule of connections corresponding to each timeslot is defined by a schedule table. This table simply identifies the set of connections that is effective for each timeslot. For example, ingress edge 1 is connected to egress edge 3, ingress edge 2 is connected to egress edge 1, and so on. Just as the arrival of the correct optical data signals has to be coordinated with the establishment of the appropriate connections, the switching between one schedule table and another must be coordinated. Otherwise, different components of the system will be operating on different schedules, potentially causing conflicts and misdelivery or loss of data.

Because all of the components of the switching system have to switch to the new schedule table at the same time, one embodiment uses the synchronization pulse frame to distribute information about which schedule table should be used. More specifically, the synchronization pulse frame includes a pair of bits, each of which corresponds to a schedule table (e.g., "table 0" and "table 1"). One of the bits indicates that the corresponding schedule table is active, and the other bit indicates that the corresponding schedule table is inactive.

When it is determined that a new schedule table should be made active, the corresponding bit is set to "1". In one embodiment, the first appearance of the changed bit indicates that the new table should be used starting with the next frame (after the current schedule has been completed). In another embodiment, the new schedule may be used after n frames have been processed using the old schedule table. This may allow time for the components to prepare for the switch to the new schedule table. After the system has started using the new schedule, the old schedule table can be recomputed and used as a "new" schedule table to replace the current ("old") one. It should be noted that FIGS. 21-26 and the accompanying discussion, describe just one embodiment of synchronization, and switching through the photonic core can be driven in any manner that can achieve nonblocking (e.g., through establishment of a schedule based on the destinations of packets arriving at the ingress edge units).

The benefits and advantages which may be provided by the present invention have been described above with regard to specific embodiments. These benefits and advantages, and any elements or limitations that may cause them to occur or to become more pronounced are not to be construed as a critical, required, or essential features of any or all of the claims. As used herein, the terms "comprises," "comprising," or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system of routing data comprising:
a plurality of ingress edge units, wherein each ingress edge unit comprises:
an ingress edge adaptation and grooming component configured to receive a plurality of input data streams and to switch the data received from the input data streams to a plurality of container processors;
ingress edge container processors coupled to receive data from the ingress edge adaptation and grooming component, configured to format the data into containers comprising a framing such that the data contained in any one container has a common destination, and operable to transmit optical data in containers, wherein each working edge container processor transmits optical data on a particular set of wavelengths;
an ingress edge container aggregation component in optical communication with the plurality of working edge container processors, wherein the edge container aggregation component is operable to multiplex signals from the plurality of working edge container processors onto a single fiber; and an ingress edge amplification and protection component in optical communication with edge container aggregation component, wherein the edge amplification and protection component is operable to amplify a multiplexed signal received from the edge container aggregation component;

a photonic core comprising:
   a plurality of inputs connected to the plurality of ingress edge units;
   a plurality of outputs;
   a plurality of path switches operable to selectively connect the plurality of inputs to the plurality of outputs in a non-blocking manner;

a plurality of egress edge units connected to the plurality of outputs of the photonic core, each egress edge unit comprising;

an egress edge amplification and protection component to receive and amplify a signal from the photonic core;

an egress edge container aggregation component in communication with the egress edge amplification and protection component operable to demultiplex a signal received from the egress edge amplification and protection component; and a plurality of egress working edge container processors in optical communication with the egress edge container aggregation component, each egress working edge container processor operable to receive containers from the egress edge container aggregation component on particular wavelengths.

2. The system of claim 1, wherein each ingress edge unit further comprises at least one ingress sparing edge container processor in optical communication with the ingress edge amplification and protection component and each egress edge unit further comprises at least one egress sparing edge container processor in optical communication with the egress edge amplification and protection component.

3. The system of claim 1, wherein each of the plurality of path switches a silicon optical amplifier (SOA).

4. The system of claim 3, wherein the photonic core further comprises a switch clock operable to send a clock signal to each of the SOAs.

5. The system of claim 4, wherein the clock signal is based on a table scheduler pulse.

6. The system of claim 5, wherein the photonic core is operable to route data in a non-blocking manner.

7. A method of routing data comprising:
   at an ingress edge unit comprising an adaptation and grooming component, a plurality of container processors coupled to receive data from the adaptation and grooming component, a container aggregation component in optical communication with the plurality of container processors and an amplification and protection component:
      receiving a plurality of input data streams;
      switching the data received from the input data streams to the plurality of container processors;
      formatting the data into containers having a framing, wherein the data contained in any one container has a common destination;
      embodying containers in optical signals having a particular set of wavelengths;
      multiplexing the optical signals embodying containers into a single multiwavelength signal; and
      amplifying the multiwavelength signal;
   at a photonic core having a plurality of path switches operable to selectively connect a plurality of inputs to a plurality of outputs in a non-blocking manner wherein an input is optically coupled to the ingress edge unit and an output is optically coupled to an egress edge unit:
      connecting the input to the output in a non-blocking manner;
   at the egress edge unit, said egress edge unit comprising an amplification and protection component, a container aggregation component and a plurality of edge container processors in optical communication with the container aggregation component:
      receiving the multiwavelength signal from the photonic core;
      amplifying the multiwavelength signal;
      demultiplexing the multiwavelength signal into a plurality of optical signals, each optical signal having a particular wavelength and embodying containers; and
      generating a plurality of output data streams from the plurality of optical signals.

8. The method of claim 7, wherein each of the plurality of path switches is an SOA.

9. The method of claim 8, further comprising sending a clock signal to each of the SOAs.

10. The method of claim 9, wherein the clock signal is based on a table scheduler pulse.

11. The method of claim 10, further comprising routing data in a non-blocking manner.

12. A computer readable storage medium embodying computer executable instructions implementing a method of:
   at an ingress edge unit comprising an adaptation and grooming component, a plurality of container processors coupled to receive data from the adaptation and grooming component, a container aggregation component in optical communication with the plurality of container processors and an amplification and protection component:
      receiving a plurality of input data streams;
      switching the data received from the input data streams to the plurality of container processors;
      formatting the data into containers having a framing, wherein the data contained in any one container has a common destination;
      embodying containers in optical signals having a particular set of wavelengths;
      multiplexing the optical signals embodying containers into a single multiwavelength signal; and
      amplifying the multiwavelength signal;
   at a photonic core having a plurality of path switches operable to selectively connect a plurality of inputs to a plurality of outputs in a non-blocking manner wherein an input is optically coupled to the ingress edge unit and an output is optically coupled to an egress edge unit:
      connecting the input to the output in a non-blocking manner;
   at the egress edge unit, said egress edge unit comprising an amplification and protection component, a container aggregation component and a plurality of edge container processors in optical communication with the container aggregation component:
      receiving the multiwavelength signal from the photonic core;
      amplifying the multiwavelength signal;

demultiplexing the multiwavelength signal into a plurality of optical signals, each optical signal having a particular wavelength and embodying containers; and generating a plurality of output data streams from the plurality of optical signals.

13. The computer readable storage medium of claim 12, wherein each of the plurality of path switches is an SOA.

14. The computer readable storage medium of claim 13, wherein a clock signal is sent to each of the SOAs.

15. The computer readable storage medium of claim 14, wherein the clock signal is based on a table scheduler pulse.

16. The computer readable storage medium of claim 15, wherein data is routed in a non-blocking manner.

* * * * *